(12) United States Patent
Atohira

(10) Patent No.: US 10,618,163 B2
(45) Date of Patent: Apr. 14, 2020

(54) SIMULATION DEVICE, SIMULATION METHOD, AND COMPUTER PROGRAM FOR ROBOT SYSTEM

(71) Applicant: FANUC CORPORATION, Yamanashi (JP)

(72) Inventor: Hiroyuki Atohira, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 58 days.

(21) Appl. No.: 15/899,319

(22) Filed: Feb. 19, 2018

(65) Prior Publication Data

US 2018/0243905 A1 Aug. 30, 2018

(30) Foreign Application Priority Data

Feb. 28, 2017 (JP) ................. 2017-037408

(51) Int. Cl.
| | | |
|---|---|---|
| *G06F 17/50* | (2006.01) | |
| *B25J 9/16* | (2006.01) | |
| *G05B 19/418* | (2006.01) | |
| *B25J 9/00* | (2006.01) | |

(52) U.S. Cl.
CPC .......... *B25J 9/1605* (2013.01); *B25J 9/0093* (2013.01); *B25J 9/1671* (2013.01); *B25J 9/1682* (2013.01); *G05B 19/4182* (2013.01); *G05B 2219/39135* (2013.01); *G05B 2219/40058* (2013.01)

(58) Field of Classification Search
CPC .. G05B 19/4061; G06Q 10/087; B21D 43/05; G06K 9/34

USPC .............. 703/2, 5, 9; 700/238, 245
See application file for complete search history.

(56) References Cited

U.S. PATENT DOCUMENTS

| | | | | |
|---|---|---|---|---|
| 4,787,280 A | * | 11/1988 | Voelkerding | ............ B23B 3/161 82/124 |
| 5,727,132 A | | 3/1998 | Arimatsu et al. | |
| 2002/0144533 A1 | * | 10/2002 | Shiroza | .................. B21D 43/05 72/405.1 |
| 2005/0178641 A1 | * | 8/2005 | Yoshida | ............... B23Q 1/5468 198/468.4 |
| 2007/0073444 A1 | | 3/2007 | Kobayashi et al. | |

(Continued)

FOREIGN PATENT DOCUMENTS

| | | |
|---|---|---|
| CN | 101105715 A | 1/2008 |
| CN | 101314225 A | 12/2008 |

(Continued)

*Primary Examiner* — Thai Q Phan
(74) *Attorney, Agent, or Firm* — Hauptman Ham LLP

(57) ABSTRACT

A simulation device that performs a convey operation simulation in which the position and orientation of a workpiece in the conveyor device changes in a random fashion. The simulation device may include a model arrangement section, an offset setting section for setting an offset amount from the reference position of the workpiece model, a conveying operation execution section for executing a convey operation to convey the workpiece model by the conveyor device model, an interference detection section for detecting interference between two workpiece models, a non-interfering position search section for searching for a non-interfering position where interference does not occur, and a workpiece position correction section for correcting the position of at least one workpiece model based on the non-interfering position.

9 Claims, 22 Drawing Sheets

(56) References Cited

U.S. PATENT DOCUMENTS

| | | | |
|---|---|---|---|
| 2007/0179671 A1 | 8/2007 | Arimatsu et al. | |
| 2008/0013825 A1 | 1/2008 | Nagatsuka et al. | |
| 2008/0301072 A1 | 12/2008 | Nagatsuka et al. | |
| 2012/0323358 A1* | 12/2012 | Izumi | G06K 9/34 |
| | | | 700/230 |
| 2013/0076892 A1* | 3/2013 | Nahum | G01B 11/002 |
| | | | 348/135 |
| 2015/0068272 A1* | 3/2015 | Kasahara | G05B 19/4061 |
| | | | 73/1.79 |
| 2015/0127148 A1 | 5/2015 | Koyanagi et al. | |
| 2015/0254380 A1 | 9/2015 | Kimoto et al. | |
| 2018/0361523 A1* | 12/2018 | Tanaka | B23Q 15/22 |
| 2019/0016543 A1* | 1/2019 | Turpin | G06Q 10/087 |

FOREIGN PATENT DOCUMENTS

| | | |
|---|---|---|
| CN | 102514010 A | 6/2012 |
| CN | 104245228 A | 12/2014 |
| CN | 105773603 A | 7/2016 |
| JP | H3-22106 A | 1/1991 |
| JP | 2008-296330 A | 12/2008 |
| JP | 2012-181574 A | 9/2012 |
| JP | 2015-168043 A | 9/2015 |
| JP | 2016-129915 A | 7/2016 |

* cited by examiner

SIMULATION DEVICE, SIMULATION METHOD, AND COMPUTER PROGRAM FOR ROBOT SYSTEM

RELATED APPLICATIONS

The present application claims priority to Japanese Patent Application No. 2017-037408 filed on Feb. 28, 2017, the disclosure of which is hereby incorporated by reference herein in its entirety.

BACKGROUND OF THE INVENTION

1. Field of the Invention

The invention relates to a simulation apparatus, a simulation method, and a computer program for a robot system.

2. Description of the Related Art

Simulation devices for performing a simulation of conveying a workpiece by a conveyor device are known in the related art (e.g., JP 2016-129915 A).

In an actual operation line, when an operator places a workpiece on a conveyor device (e.g., a belt conveyor), the position and orientation of the workpiece on the conveyor device may change. There is demand for technology for simulating operations such as these.

SUMMARY OF THE INVENTION

In an aspect of the present disclosure, a simulation device for a robot system in which a robot carries out a work on a plurality of workpieces conveyed by a conveyor device, includes a model arrangement section configured to arrange, in a virtual space, a plurality of workpiece models and a conveyor device model that model the plurality of workpieces and the conveyor device, respectively; an offset setting section configured to set an offset amount of each workpiece model from its reference position predetermined with respect to the conveyor device model; a conveying operation execution section configured to carry out a conveying operation to sequentially convey the plurality of workpiece models, each of which is arranged at a position obtained from the reference position and the offset amount, by the conveyor device model; an interference detection section configured to detect interference between at least two workpiece models sequentially conveyed by the conveyor device model; a non-interfering position search section configured to search a non-interfering position where the interference does not occur for at least one workpiece model of the at least two workpiece models for which the interference is detected; and a workpiece position correction section configured to correct a position of the at least one workpiece model arranged on the conveyor device model, based on the searched non-interfering position.

In another aspect of the present disclosure, a simulation method for a robot system in which a robot carries out a work on a plurality of workpieces conveyed by a conveyor device, includes arranging, in a virtual space, a plurality of workpiece models and a conveyor device model that model the plurality of workpieces and the conveyor device, respectively; setting an offset amount of each workpiece model from its reference position predetermined with respect to the conveyor device model; carrying out a conveying operation to sequentially convey the plurality of workpiece models, each of which is arranged at a position obtained from the reference position and the offset amount, by the conveyor device model; detecting interference between at least two workpiece models sequentially conveyed by the conveyor device model; searching a non-interfering position where the interference does not occur for at least one workpiece model of the at least two workpiece models for which the interference is detected; and correcting a position of the at least one workpiece model arranged on the conveyor device model, based on the searched non-interfering position.

In still another aspect of the present disclosure, a computer program configured to cause a computer, in order to execute a simulation in which a robot carries out a work on a plurality of workpieces conveyed by a conveyor device, to function as a model arrangement section configured to arrange, in a virtual space, a plurality of workpiece models and a conveyor device model that model the plurality of workpieces and the conveyor device, respectively; an offset setting section configured to set an offset amount of each workpiece model from its reference position predetermined with respect to the conveyor device model; a conveying operation execution section configured to carry out a conveying operation to sequentially convey the plurality of workpiece models, each of which is arranged at a position obtained from the reference position and the offset amount, by the conveyor device model; an interference detection section configured to detect interference between at least two workpiece models sequentially conveyed by the conveyor device model; a non-interfering position search section configured to search a non-interfering position where the interference does not occur for at least one workpiece model of the at least two workpiece models for which the interference is detected; and a workpiece position correction section configured to correct a position of the at least one workpiece model arranged on the conveyor device model, based on the searched non-interfering position.

According to an aspect of the present disclosure, it is possible to provide a device capable of simulating an operation of a conveyor device in a manner similar to an actual operation, while preventing occurrence of an interference region between workpiece models arranged in a virtual space.

According to another aspect of the present disclosure, it is possible to provide a method capable of simulating an operation of a conveyor device in a manner similar to an actual operation, while preventing occurrence of an interference region between workpiece models.

According to still another aspect of the present disclosure, it is possible to provide a computer program that causes a computer to execute a simulation of an operation of a conveyor device in a manner similar to an actual operation, while preventing occurrence of an interference region between workpiece models.

BRIEF DESCRIPTION OF THE DRAWINGS

The objects, features and advantages of the invention will become more apparent from the following description of the embodiments in connection with the accompanying drawings, wherein.

DETAILED DESCRIPTION

Figure 1:
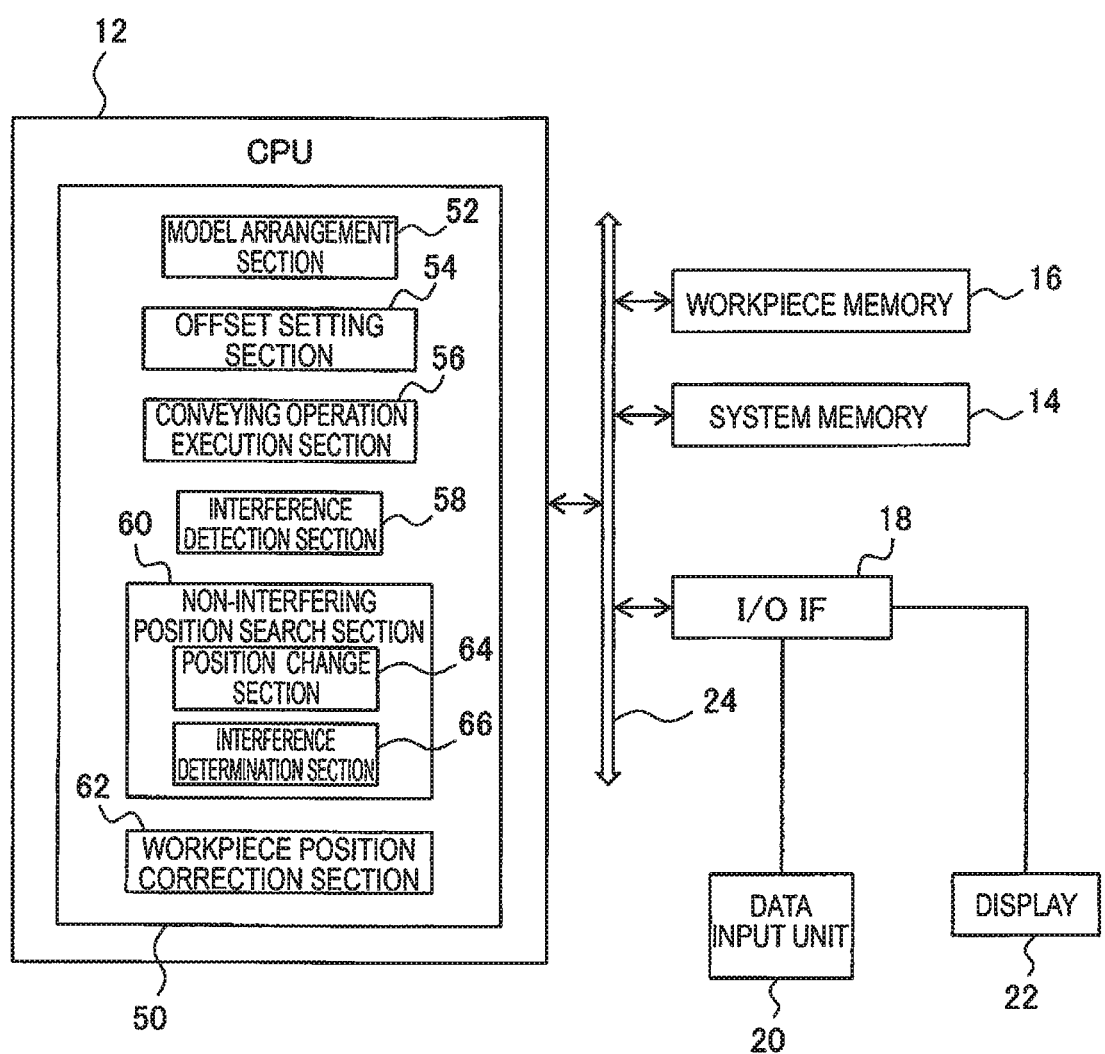
FIG. 1 is a block diagram of a simulation system according to an embodiment.

Hereinafter, embodiments of the present disclosure will be described in detail with reference to the drawings. Note that, in various embodiments described below, the same reference numerals are given to similar components, and redundant explanations thereof will be omitted. First, a simulation system 10 according to an embodiment will be described with reference to FIG. 1.

The simulation system 10 includes a CPU 12, a system memory 14, a working memory 16, an input/output interface (I/O interface) 18, a data input unit 20, a display 22, and a simulation device 50.

The CPU 12 is communicatively connected to the system memory 14, the working memory 16, and the I/O interface via a bus 24, and communicates these components to execute various processes described later.

The system memory 14 is a nonvolatile memory that can be electrically erased and recorded, and is comprised of e.g. EEPROM (registered trade mark). The system memory 14 records constants, variables, setting values, computer programs, etc., necessary for executing a simulation described later, so as not to lose when the simulation system 10 is shut down.

The working memory 16 temporarily stores data necessary for the CPU 12 to execute various processes. Further, the constants, variables, setting values, computer programs, etc., recorded in the system memory 14 are suitably loaded on the working memory 16, and the CPU 12 makes use of these data loaded on the working memory 16 in order to execute various processes.

The I/O interface 18 is communicably connected to the data input unit 20, and receive data from the data input unit 20 in accordance with a command from the CPU 12. Further, the I/O interface 18 is communicably connected to the display 22, and transmit image data to the display 22 in accordance with a command from the CPU 12.

The I/O interface 18 is comprised of e.g. an Ethernet port or USB port, and may wiredly communicate the data input unit 20 and the display 22. Alternatively, the I/O interface 18 may wirelessly communicate the display 22 and the data input unit 20 via a wireless LAN such as Wi-Fi.

The data input unit 20 is comprised of e.g. a keyboard, a touch panel, or a mouse, and an operator can input data by operating the data input unit 20. The data input unit 20 may transmit the input data to the CPU 12 via the I/O interface 18.

The display 22 is comprised of e.g. a CRT, a liquid crystal display (LCD), or an organic EL display, and receives the image data transmitted from the I/O interface 18 and display it as an image visible for the operator.

The simulation device 50 executes a simulation of a robot system in which a robot carries out a work on a plurality of workpieces conveyed by a conveyor device. Below, an example of the conveyor device 100 in a real space will be described with reference to FIG. 2.

The conveyor device 100 is e.g. a belt conveyor, and includes a base 102 and a conveying section 104 movably disposed on the base 102. The base 102 is fixed on a floor of a work cell in the real space. The conveying section 104 conveys a workpiece W placed thereon in a conveying direction A indicated by arrow A in FIG. 2. In this embodiment, the workpiece W has a rectangular solid shape.

Figure 3:
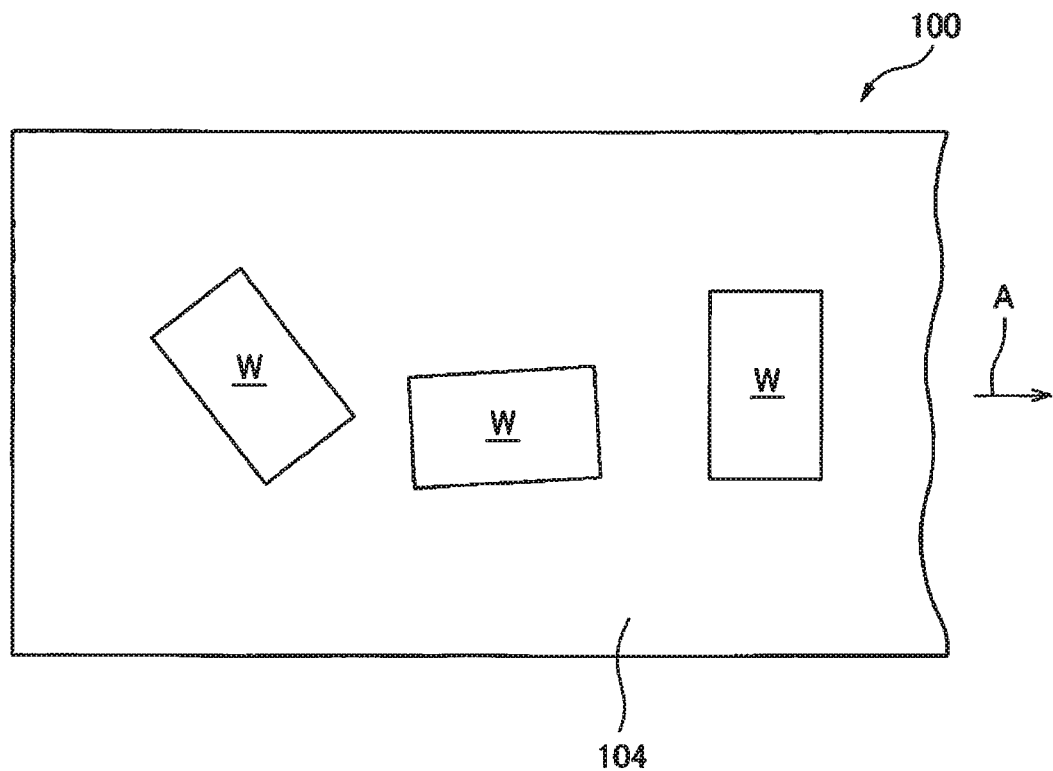
FIG. 3 is a view of the conveyor device illustrated in FIG. 2 when viewed from vertically upward.

In a work line in the real space, the operator continuously places workpieces W near the upstream end of the conveying section 104. The positions and orientations of the workpieces W, which are placed on the conveying section 104 at this time, with respect to the conveying section 104 may vary randomly, as illustrated in FIG. 3. In this way, the workpieces W are continuously placed in the vicinity of the upstream end of the conveying section 104, and sequentially conveyed in the conveying direction A by the conveying section 104.

The simulation device 50 according to this embodiment simulates such an operation of the conveyor device 100. As illustrated in FIG. 1, the simulation device 50 includes a model arrangement section 52, an offset setting section 54, a conveying operation execution section 56, an interference detection section 58, a non-interfering position search section 60, and a workpiece position correction section 62.

In this embodiment, the CPU 12 functions as the model arrangement section 52, the offset setting section 54, the conveying operation execution section 56, the interference detection section 58, the non-interfering position search section 60, and the workpiece position correction section 62. The functions of the model arrangement section 52, the offset setting section 54, the conveying operation execution section 56, the interference detection section 58, the non-interfering position search section 60, and the workpiece position correction section 62 will be described later.

Next, the operation of the simulation system 10 will be described with reference to FIG. 4. The flow illustrated in FIG. 4 is started when the operator operates the data input unit 20 so as to input a simulation-start command and the CPU 12 receives the simulation-start command from the data input unit 20, for example.

Figure 4:
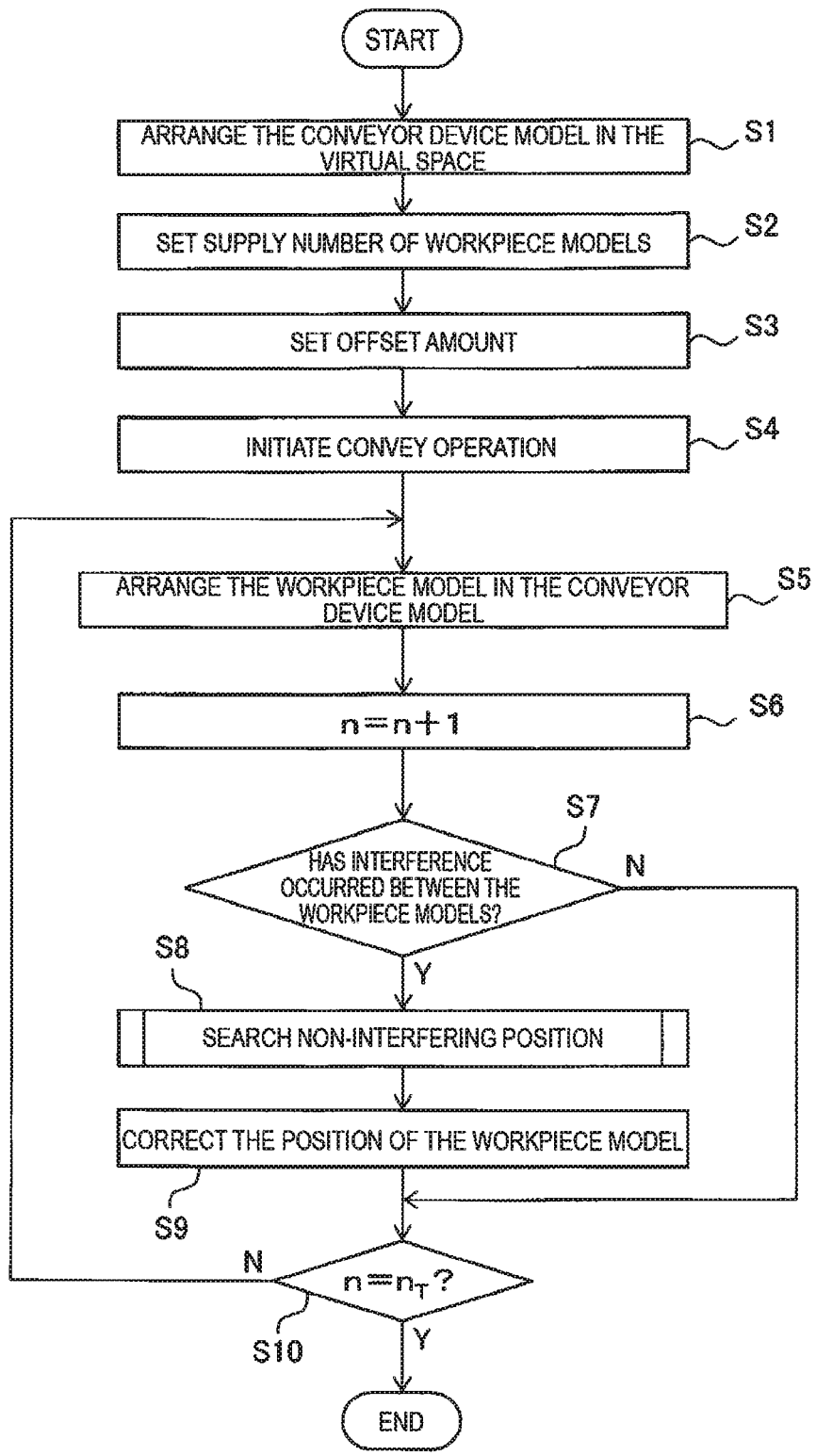
FIG. 4 is a flowchart illustrating an example of an operation flow of the simulation system illustrated in FIG. 1.

Note that, the CPU 12 may execute the steps S1 to S10 illustrated in FIG. 4 in accordance with a computer program. The computer program may be pre-stored in the system memory 14. Alternatively, the computer program may be recorded in a recording medium (e.g., a hard disk, EEPROM, etc.) externally attached to the simulation system 10.

Figure 5:
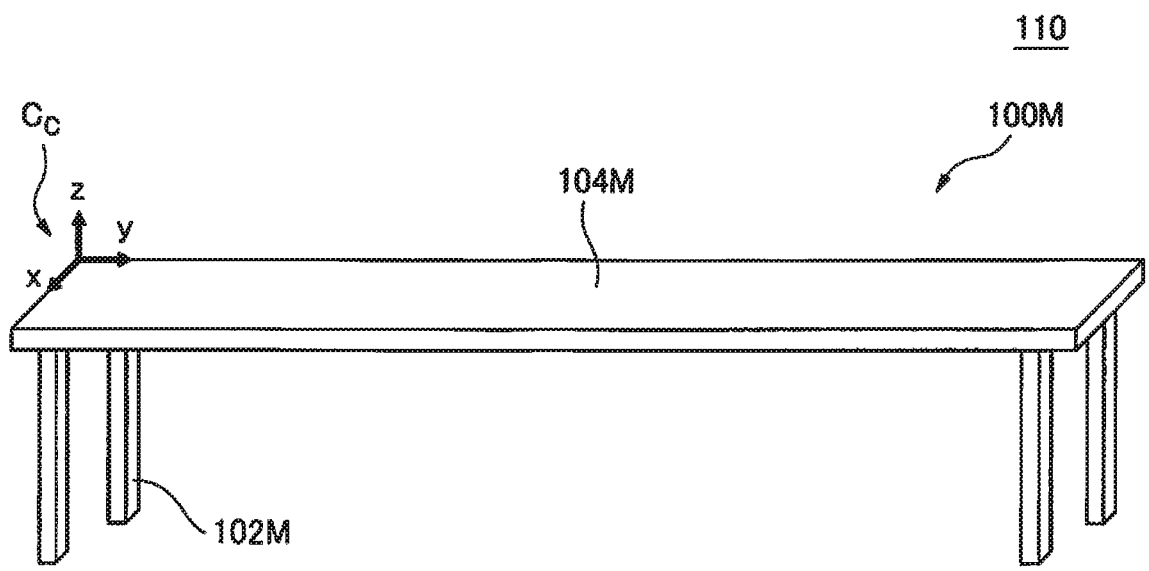
FIG. 5 illustrates an image of the virtual space generated in Step S1 in FIG. 4.

In Step S1, the CPU 12 arranges, in the virtual space, component models that models components of the conveyor device. In particular, as illustrated in FIG. 5, the CPU 12 arranges a conveyor device model 100M in the virtual space 110 in response to an input operation by the operator.

Note that, in the present disclosure, if the name of a component in the real space is "XX," the model in the virtual space thereof is referred to as an "XX model." For example, the model of the "conveying section" in the real space is referred to as a "conveying section model."

Figure 2:
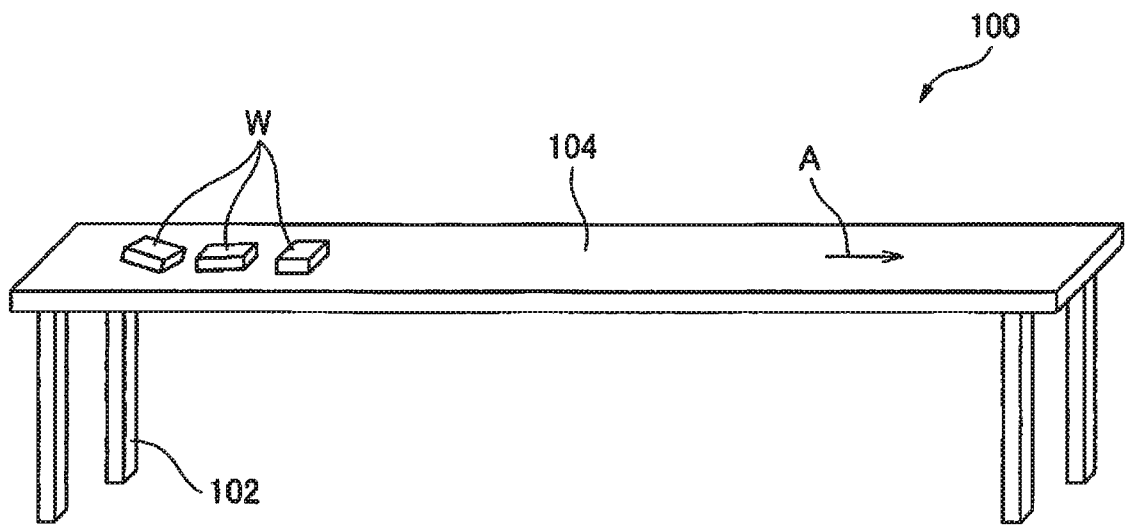
FIG. 2 is a diagram illustrating an example of a conveyor device in a real space.

The conveyor device model 100M is a model of the conveyor device 100 illustrated in FIG. 2, and includes a base model 102M and a conveying section model 104M.

The system memory 14 pre-stores a plurality of types of conveyor device models including the conveyor device model 100M. As an example, the CPU 12 generates image data representing the plurality of types of conveyor device models stored in the system memory 14 in the form of a list, and displays it by the display 22. The operator operates the data input unit 20 so as to select a desired conveyor device model from the list displayed on the display 22.

Hereinafter, a case is described where the operator selects the conveyor device model 100M illustrated in FIG. 5. The data input unit 20 transmits the input data input by the operator to the CPU 12 via the I/O interface 18.

In response to the received input data, the CPU 12 reads out the conveyor device model 100M from the plurality of types of conveyor device models stored in the system memory 14, and arrange it in the virtual space 110. Then, the CPU 12 generates the virtual space 110 as image data, and displays it by the display 22 as an image of the virtual space 110 illustrated in FIG. 5.

The system memory 14 stores various virtual conveyor device operation parameters in association with the conveyor device model 100M. The virtual conveyor device operation parameters are necessary for simulatively operating the conveyor device model 100M in the virtual space 110 in Step S4 described later.

The virtual conveyor device operation parameters includes e.g. an origin and axial directions of a conveyor device coordinate system $C_C$, a conveying speed of the conveyor device model 100M, etc. The conveyor device coordinate system $C_C$ is an orthogonal coordinate system used as a standard when simulatively operating the conveyor device model 100M in the virtual space 110, and is defined in the virtual space 110 by the origin and axial directions of the conveyor device coordinate system $C_C$ included in the virtual conveyor device operation parameters.

In the embodiment illustrated in FIG. 5, the origin of the conveyor device coordinate system $C_C$ is arranged at a corner of the upstream end of the conveying section model 104M, and the conveying section model 104M conveys a workpiece model described later in the y-axis positive direction of the conveyor device coordinate system $C_C$. Thus, the y-axis positive direction of the conveyor device coordinate system $C_C$ coincides with the conveying direction A in FIG. 2.

The conveying speed is a parameter that determines the speed at which a workpiece model is conveyed by the conveying section model 104M in the virtual space 110 (i.e., the operation speed of the conveying section model 104M).

As illustrated in FIG. 5, the CPU 12 sets the conveyor device coordinate system $C_C$ in the virtual space 110 together with the conveyor device model 100M. Thus, in this embodiment, the CPU 12 functions as the model arrangement section 52 (FIG. 1) configured to arrange the conveyor device model 100M in the virtual space 110.

In Step S2, the CPU 12 sets the total number $n_T$ of workpiece models to be supplied in the virtual space 110 in the simulation described later. As an example, the CPU 12 generates input image data to enable the operator to input the total number $n_T$, and display it on the display 22.

The operator operates the data input unit 20 so as to input the desired total number $n_T$ to the input image displayed on the display 22. The data input unit 20 transmits the input data of the total number $n_T$ input by the operator to the CPU 12 via the I/O interface 18. In response to the received input data, the CPU 12 sets the total number $n_T$ and store the setting of the total number $n_T$ in the system memory 14.

In Step S3, the CPU 12 sets an offset amount for when arranging workpiece models on the conveyor device model 100M in the virtual space 110. This offset amount will be described with reference to FIG. 6 to FIG. 10.

Figure 6:
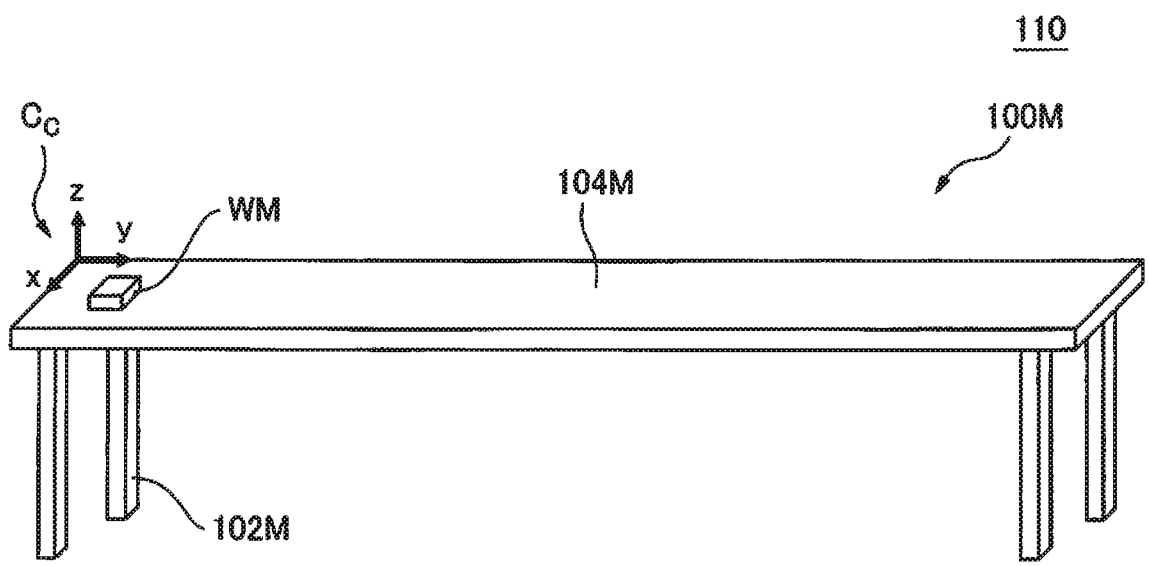
FIG. 6 illustrates a state in which a workpiece model is arranged at a reference position on the conveying section model in the virtual space illustrated in FIG. 5.
Figure 7:
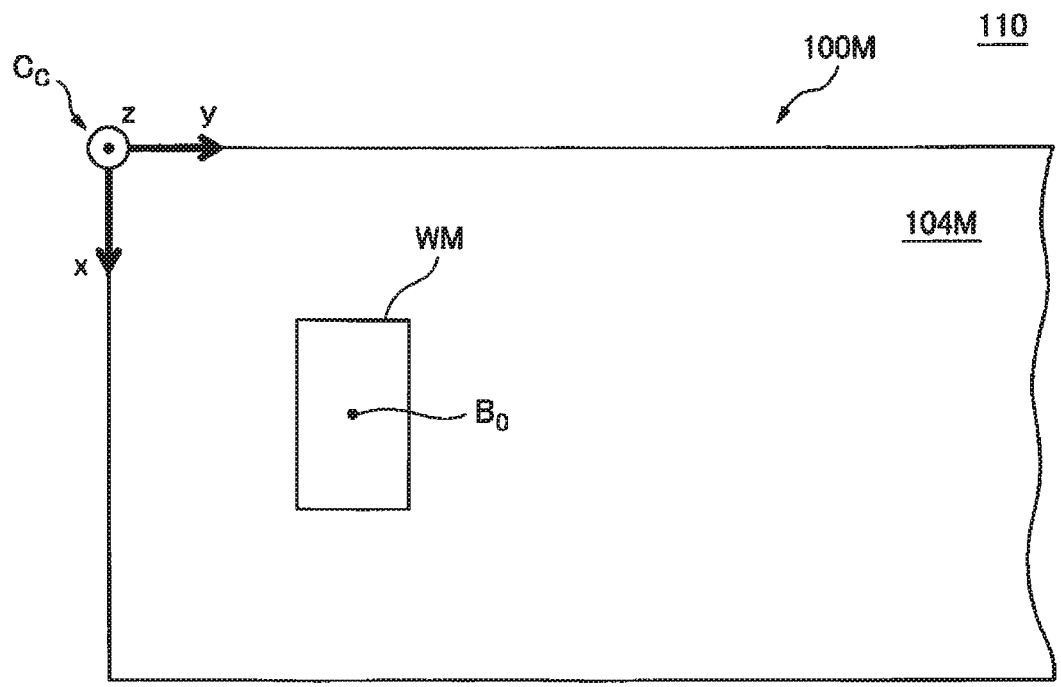
FIG. 7 is a view of the workpiece model illustrated in FIG. 6 as seen from the z-axis positive direction of the conveyor device coordinate system in FIG. 6.

In Step S5 described later, the CPU 12 arranges a workpiece model WM that models the workpieces W on the conveying section model 104M in the virtual space 110. FIG. 6 and FIG. 7 illustrate a state in which the workpiece model WM is arranged at a reference position on the conveying section model 104M.

The reference position is predetermined with respect to the conveying section model 104M. In the example illustrated in FIG. 6 and FIG. 7, the reference position is set as follows. A center $B_0$ of the workpiece model WM is arranged at the center in the x-axis direction of the conveyor device coordinate system $C_C$ of the conveying section model 104M. Further, the longitudinal direction (i.e., the extending direction of the longitudinal side) of the workpiece model WM is parallel to the x-axis direction of the conveyor device coordinate system $C_C$, while the lateral direction (i.e., the extending direction of the lateral side) of the workpiece model WM is parallel to the y-axis direction of the conveyor device coordinate system $C_C$.

The offset amount in this embodiment represents a displacement amount of the workpiece model WM from its reference position in the x-y plane of the conveyor device coordinate system $C_C$ when the workpiece model WM is arranged on the conveying section model 104M in Step S5 described later.

Figure 8:
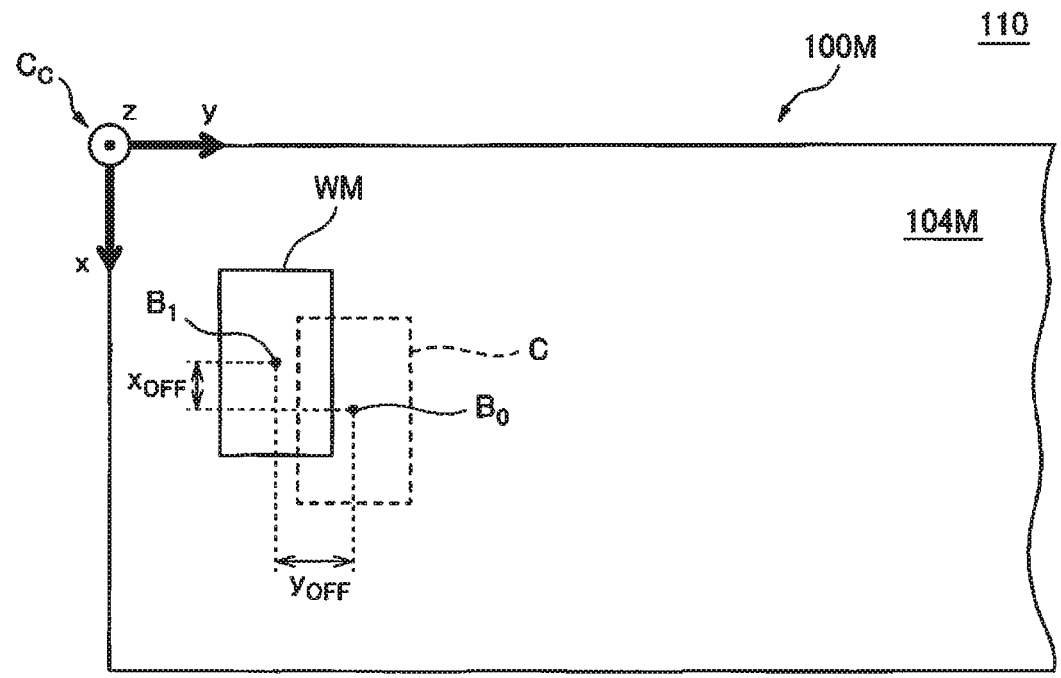
FIG. 8 is a diagram for explaining a first offset amount in the x-axis direction of the conveyor device coordinate system and a second offset amount in the y-axis direction of the conveyor device coordinate system.

For example, in the example illustrated in FIG. 8, the reference position is represented by the dotted line area C, and the center $B_1$ of the workpiece model WM is displaced from the center $B_0$ of the reference position C by $x_{OFF}$ in the x-axis negative direction (i.e., $-x_{OFF}$) of the conveyor device coordinate system $C_C$, and displaced by $y_{OFF}$ in the y-axis negative direction (i.e., $-y_{OFF}$) of the conveyor device coordinate system $C_C$.

Thus, in the example illustrated in FIG. 8, a first offset amount $x_{OFF}$ offset from the reference position in the x-axis direction of the conveyor device coordinate system $C_C$ and a second offset amount $y_{OFF}$ offset from the reference position in the y-axis direction of the conveyor device coordinate system $C_C$ are set as the offset amount.

Figure 9:
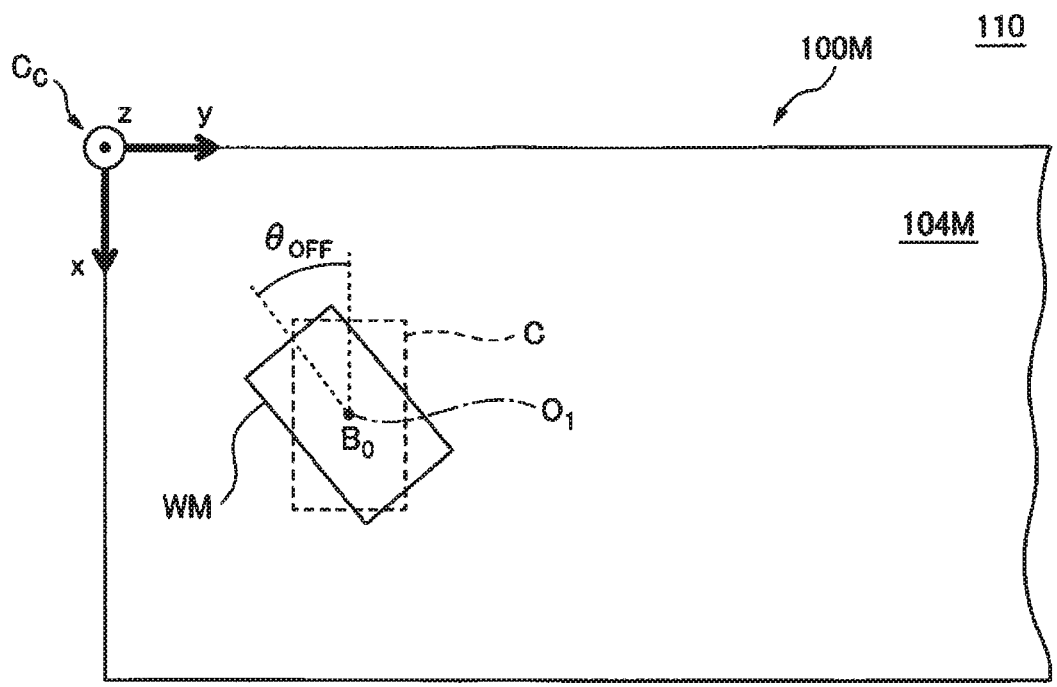
FIG. 9 is a diagram for explaining a third offset amount about an axis parallel to the z-axis of the conveyor device coordinate system.

In the example illustrated in FIG. 9, the position of the workpiece model WM is offset to a position rotated about an axis $O_1$ from the reference position C by an angle $\theta_{OFF}$ in the counterclockwise direction when viewed from the z-axis positive direction of the conveyor device coordinate system $C_C$.

The axis $O_1$ is a virtual axis which is parallel to the z-axis of the conveyor device coordinate system $C_C$ and which passes the center of the workpiece model WM. Thus, in the example illustrated in FIG. 9, a third offset amount $\theta_{OFF}$ offset from the reference position in the direction of rotation about the axis $O_1$ is set as the offset amount.

Figure 10:
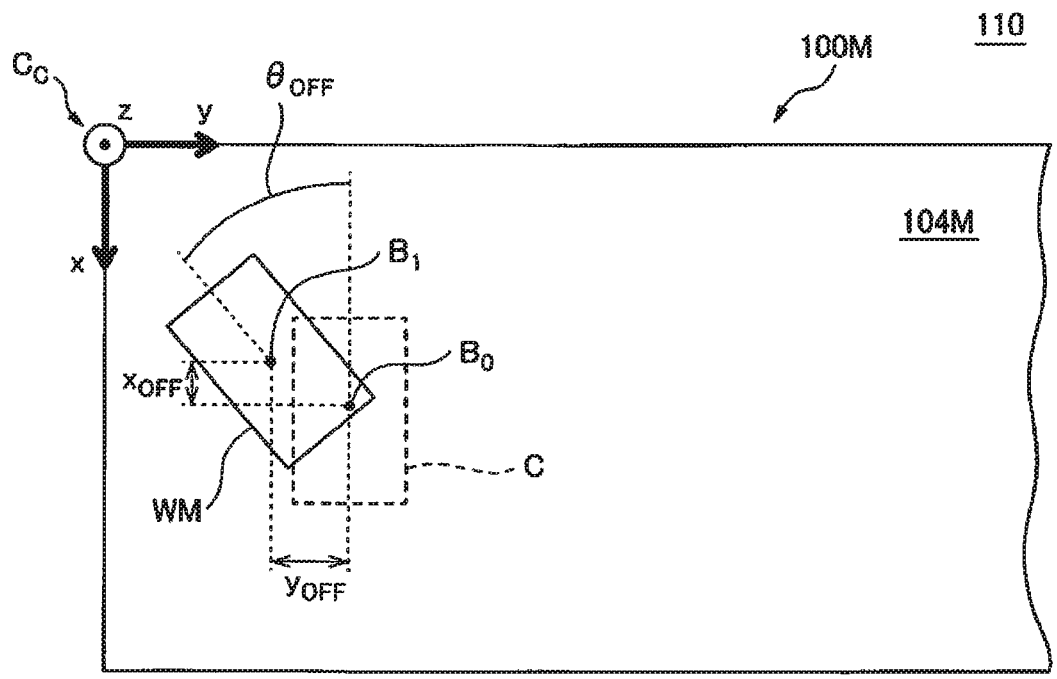
FIG. 10 is a diagram for explaining the first, second, and third offset amounts.

In the example illustrated in FIG. 10, the position of the workpiece model WM is offset from the reference position by the first offset amount $x_{OFF}$, the second offset amount $y_{OFF}$, and the third offset amount $\theta_{OFF}$.

In particular, the center $B_1$ of the workpiece model WM is displaced by $x_{OFF}$ in the x-axis negative direction of the conveyor device coordinate system $C_C$, and displaced by $y_{OFF}$ in the y-axis negative direction of the conveyor device coordinate system $C_C$. In addition, the workpiece model WM is offset so as to be rotated by the angle $\theta_{OFF}$ about the axis $O_1$.

As an example, in this Step S3, an operator inputs an upper limit value and lower limit value of the offset amount ($x_{OFF}$, $y_{OFF}$, $\theta_{OFF}$). In this case, the CPU 12 generates input image data for enabling the operator to input the upper limit value and the lower limit value of the offset amount ($x_{OFF}$, $y_{OFF}$, $\theta_{OFF}$), and display it on the display 22. The operator operates the data input unit 20 so as to input a desired upper limit value and lower limit value to the input image displayed on the display 22.

For example, it is assumed that the operator inputs an upper limit value $x_{MAX}$ and a lower limit value $x_{MIN}$ for the first offset amount $x_{OFF}$, an upper limit value $y_{MAX}$ and $y_{MIN}$ for the second offset amount $y_{OFF}$, and an upper limit value $\theta_{MAX}$ and a lower limit value $\theta_{MIN}$ for the third offset amount $\theta_{OFF}$, respectively.

In this case, the data input unit 20 transmits the input data of the upper limit values ($x_{MAX}$, $y_{MAX}$, $\theta_{MAX}$) and the lower limit values ($x_{MIN}$, $y_{MIN}$, $\theta_{MIN}$) input by the operator to the CPU 12 via the I/O interface 18.

In accordance with the received input data, the CPU 12 sets the range of the first offset amount $x_{OFF}$ to $x_{MIN} \leq x_{OFF} \leq x_{MAX}$. Here, if the upper limit value $x_{MAX}$ and the lower limit value $x_{MIN}$ are positive values, they respectively represent offset amounts to be offset from the reference position C by the coordinates $x_{MAX}$ and $x_{MIN}$ in the x-axis positive direction of the conveyor device coordinate system $C_C$.

On the other hand, if the upper limit value $x_{MAX}$ and the lower limit $x_{MIN}$ are negative values, they respectively represent offset amounts to be offset from the reference position C by the coordinates $x_{MAX}$ and $x_{MIN}$ in the x-axis negative direction of the conveyor device coordinate system $C_C$.

Further, in accordance with the received input data, the CPU 12 sets the range of the second offset amount $y_{OFF}$ to $y_{MIN} \leq y_{OFF} \leq y_{MAX}$. Here, if the upper limit value $y_{MAX}$ and the lower limit value $y_{MIN}$ are positive values, they respectively represent offset amounts to be offset from the reference position C by the coordinates $y_{MAX}$ and $y_{MIN}$ in the y-axis positive direction of the conveyor device coordinate system $C_C$.

On the other hand, if the upper limit value $y_{MAX}$ and the lower limit $y_{MIN}$ are negative values, they respectively represent offset amounts to be offset from the reference position C by the coordinates $y_{MAX}$ and $y_{MIN}$ in the y-axis negative direction of the conveyor device coordinate system $C_C$.

Further, in accordance with the received input data, the CPU 12 sets the range of the third offset amount $\theta_{OFF}$ to $\theta_{MIN} \leq \theta_{OFF} \leq \theta_{MAX}$. Here, if the upper limit value $\theta_{MAX}$ and the lower limit value $\theta_{MIN}$ are positive values, they respectively represent offset amounts to be rotated about the axis $O_1$ from the reference position C by angles $\theta_{MAX}$ and $\theta_{MIN}$ in the counterclockwise direction when viewed from the z-axis positive direction of the conveyor device coordinate system $C_C$.

On the other hand, if the upper limit value $\theta_{MAX}$ and the lower limit value $\theta_{MIN}$ are negative values, they respectively represent offset amounts to be rotated about the axis $O_1$ from the reference position C by angles $\theta_{MAX}$ and $\theta_{MIN}$ in the clockwise direction when viewed from the z-axis positive direction of the conveyor device coordinate system $C_C$.

As another example, in this Step S3, the operator inputs only one threshold value for the offset amount ($x_{OFF}$, $y_{OFF}$, $\theta_{OFF}$). In this case, the CPU 12 generates input image data to enable the operator to input the threshold value for the offset amounts ($x_{OFF}$, $y_{OFF}$, $\theta_{OFF}$), and display it on the display 22. The operator operates the data input unit 20 so as to input a desired threshold value to the input image displayed on the display 22.

For example, it is assumed that the operator inputs a threshold value $x_1$ for the first offset amount $x_{OFF}$, a threshold value $y_1$ for the second offset amount $y_{OFF}$, and a threshold value $\theta_1$ for the third offset amount $\theta_{OFF}$, respectively. In this case, the data input unit 20 transmits the input data of the threshold values ($x_1$, $y_1$, $\theta_1$) input by the operator to the CPU 12 via the I/O interface 18.

In accordance with the received input data, the CPU 12 sets the range of the first offset amount $x_{OFF}$ as $-x_1 \leq x_{OFF} \leq x_1$, $0 \leq x_{OFF} \leq x_1$, or $-x_1 \leq x_{OFF} \leq 0$.

In addition, the CPU 12 sets the range of the second offset amount $y_{OFF}$ as $-y_1 \leq y_{OFF} \leq y_1$, $0 \leq y_{OFF} \leq y_1$, or $-y_1 \leq y_{OFF} \leq 0$. In addition, the CPU 12 sets the range of the third offset amount $\theta_{OFF}$ as $-\theta_1 \leq \theta_{OFF} \leq \theta_1$, $0 \leq \theta_{OFF} \leq \theta_1$, or $-\theta_1 \leq \theta_{OFF} \leq 0$.

In this way, the CPU 12 receives the input of values $x_{MAX}$, $y_{MAX}$, $\theta_{MAX}$, $x_{MIN}$, $y_{MIN}$, $\theta_{MIN}$, $x_1$, $y_1$ or $\theta_1$) that determine the offset amounts $x_{OFF}$, $y_{OFF}$, and $\theta_{OFF}$, and sets the offset amounts $x_{OFF}$, $y_{OFF}$, and $\theta_{OFF}$. Accordingly, the CPU 12 functions as the offset setting section 54 (FIG. 1) configured to set the offset amounts $x_{OFF}$, $y_{OFF}$, and $\theta_{OFF}$ of each workpiece model WM from its reference position C.

In Step S4, the CPU 12 executes a convey operation to simulatively convey the workpiece model WM by the conveyor device model 100M in the virtual space 110. In particular, the CPU 12 simulatively operates the conveyor device model 100M in the virtual space 110 so as to convey the workpiece model WM in the y-axis positive direction of the conveyor device coordinate system $C_C$ when the workpiece model WM is arranged on the conveyor device model 104M.

Thus, in this embodiment, the CPU 12 functions as the conveying operation execution section 56 (FIG. 1) configured to carry out a convey operation to convey the workpiece model WM by the conveyor device model 100M.

In Step S5, the CPU 12 arranges the workpiece model WM on the conveyor device model 100M in the virtual space 110. At this time, the CPU 12 randomly determines the offset amounts $x_{OFF}$, $y_{OFF}$, and $\theta_{OFF}$ within the ranges of the offset amounts $x_{OFF}$, $y_{OFF}$, and $\theta_{OFF}$ set in Step S3.

For example, the CPU 12 randomly determines the first offset amount $x_{OFF}$ as a value within the range of $x_{MIN} \leq x_{OFF} \leq x_{MAX}$. In addition, the CPU 12 randomly determines the second offset amount $y_{OFF}$ as a value within the range of $y_{MIN} \leq y_{OFF} \leq y_{MAX}$. In addition, the CPU 12 randomly determines the second offset amount $\theta_{OFF}$ as a value within the range of $\theta_{MIN} \leq \theta_{OFF} \leq \theta_{MAX}$.

Then, the CPU 12 obtains an offset position offset from the reference position C by the determined offset amounts $x_{OFF}$, $y_{OFF}$, and $\theta_{OFF}$, and arrange the workpiece WM at the offset position in the conveying section model 104M.

Thus, in this embodiment, the CPU 12 arranges the workpiece WM on the conveying section model 104M within a position range (e.g., the closed interval $[x_{MIN}, x_{MAX}]$, $[y_{MIN}, y_{MAX}]$ $[\theta_{MIN}, \theta_{MAX}]$) between the reference position C and a position offset from the reference position C by the offset amounts set in Step S3 (e.g.,)($x_{MAX}$, $y_{MAX}$, $\theta_{MAX}$, $x_{MIN}$, $y_{MIN}$, $\theta_{MIN}$) in this Step S5.

Figure 11:
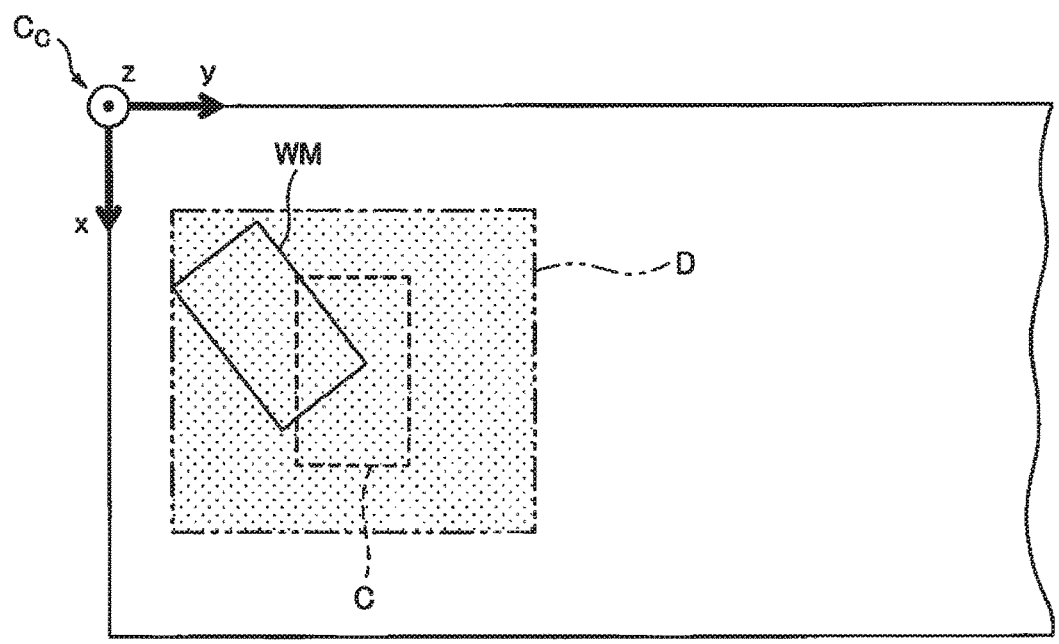
FIG. 11 illustrates a position range where the workpiece model can be arranged in Step S5 of FIG. 4.

In FIG. 11, the position range in which the CPU 12 may arrange the workpiece model WM in Step S5 is indicated by the two-dot line region D. The position range D represents a range that the workpiece model WM may occupy on the conveying section model 104M when the CPU arranges the workpiece model M within the range of the offset amounts set in Step S3 (e.g., $[x_{MIN}, x_{MAX}]$, $[y_{MIN}, y_{MAX}]$ $[\theta_{MIN}, \theta_{MAX}]$).

The position range D varies depending on the offset amounts set in Step S3 ($x_{MAX}$, $y_{MAX}$, $\theta_{MAX}$, $x_{MIN}$, $y_{MIN}$, $\theta_{MIN}$, $x_1$, $y_1$, or $\theta_1$). Thus, in this embodiment, the CPU 12 functions as the model arrangement section 52 and arranges the workpiece model WM on the conveyor device model 100M in the virtual space 110.

As illustrated in FIG. 4, the CPU 12 executes a loop of Steps S5 to S10 until it determines YES in Step S10 described later. Accordingly, the CPU 12 continuously arranges the workpiece model WM on the conveyor device model 100M each time the CPU 12 carries out Step S5.

Figure 12:
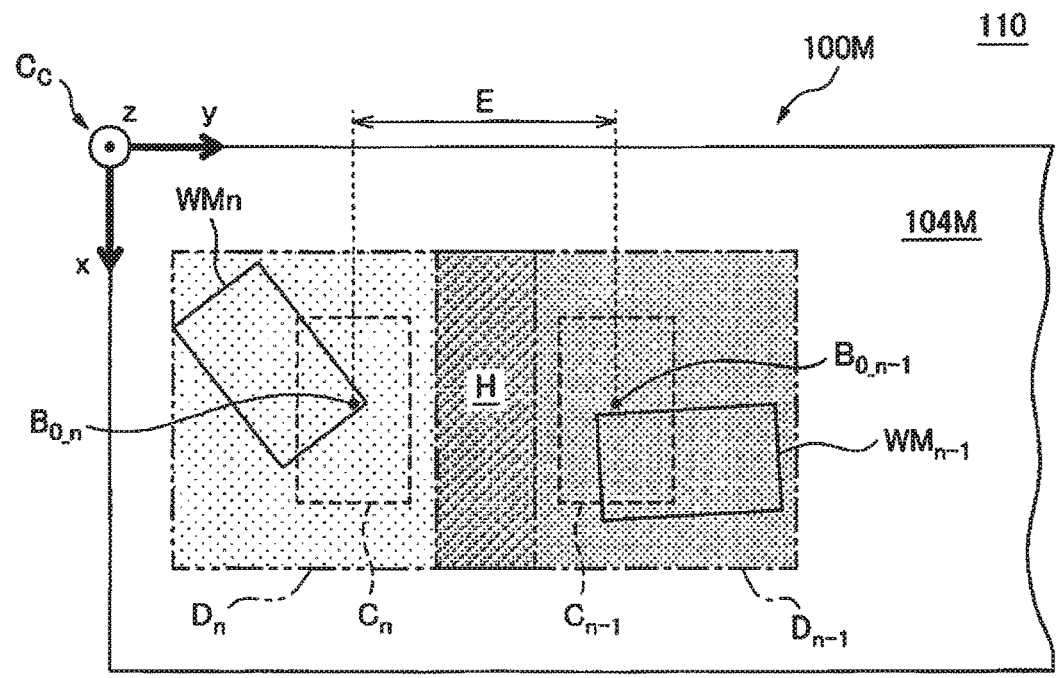
FIG. 12 illustrates position ranges of two adjacent workpiece models.

FIG. 12 shows the position range of the workpiece model $WM_{n-1}$ arranged in the (n−1)-th Step S5 as a one-dot line region $D_{n-1}$, and the position range of the workpiece model $WM_n$ arranged in the n-th Step S5 as a two-dot line region $D_n$.

In Step S5 executed for the n-th time, the CPU 12 arranges the workpiece model $WM_n$ after the workpiece model $WM_{n-1}$ arranged in the (n−1)-th Step S5 is conveyed by the conveyor device model 100M.

At this time, the CPU 12 arranges the workpiece model $WM_n$ such that the position range $D_{n-1}$ of the workpiece model $WM_{n-1}$ arranged in the (n−1)-th Step S5 and the position range $D_n$ of the workpiece model $WM_n$ arranged in the n-th Step S5 overlap with each other in region H of at least a part of the position range.

The interval E between the workpiece models $WM_{n-1}$ and $WM_n$ adjacent to each other is predetermined by the operator. The interval E represents the distance in the y-axis direction of the conveyor device coordinate system $C_C$ between the center $B_{0\_n-1}$ of the reference position $C_{n-1}$ of the workpiece model $WM_{n-1}$ and the center $B_{0\_n}$ of the reference position $C_n$ of the workpiece model $WM_n$. The interval E is determined such that the position range $D_{n-1}$ and the position range $D_n$ overlap with each other.

As an example, in Step S3, the CPU 12 generates input image data to enable the operator to input the interval E in addition to the offset amounts ($x_{MAX}$, $y_{MAX}$, $\theta_{MAX}$, $x_{MIN}$, $y_{MIN}$, $\theta_{MIN}$, $x_1$, $y_1$, or $\theta_1$), and display it on the display 22. The operator operates the data input unit 20 so as to input a desired interval E into the input image displayed on the display 22.

At this time, the CPU 12 may determine whether the adjacent position ranges $D_{n-1}$ and $D_n$ overlap with each other based on the input offset amount and the interval E. If the CPU 12 determines that the position ranges $D_{n-1}$ and $D_n$ do not overlap with each other, the CPU 12 may display an image indicative of it on the display 22.

In Step S6, the CPU 12 increments the value of the total number "n" of the workpiece models WM, which have been supplied to the conveyor device model 100M from the start of Step S4, by "1" (i.e., n=n+1). Note that, at the start of the flow illustrated in FIG. 4, the CPU 12 sets the total number "n" to "0" (i.e., n=0).

In Step S7, the CPU 12 determines whether interference is detected between one workpiece model arranged in the most-recent Step S5 and another workpiece model arranged before the one workpiece model.

For example, when the CPU 12 carries out the n-th Step S7, the CPU 12 determines whether interference is detected between the workpiece model $WM_n$ arranged in the n-th Step S5 and the workpiece model $WM_{n-1}$ arranged in the (n−1)-th Step S5.

Figure 13:
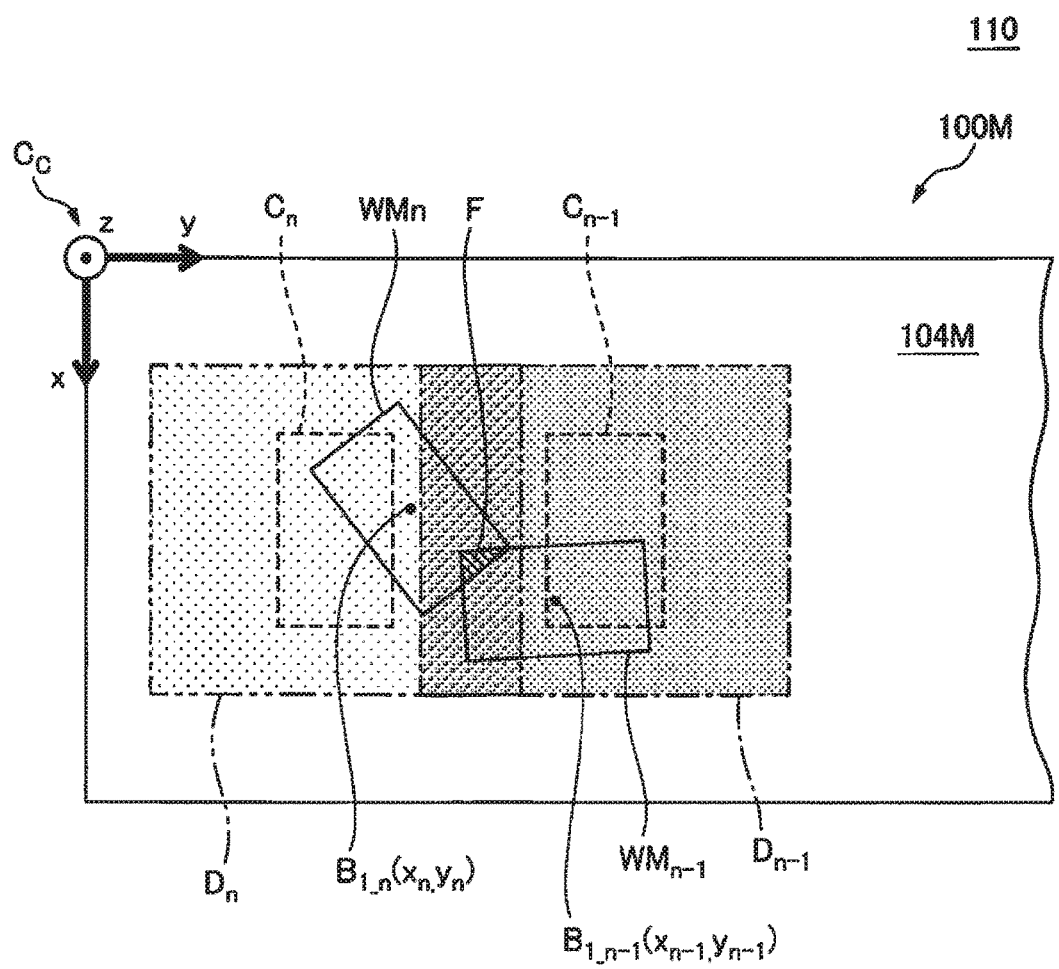
FIG. 13 illustrates a state in which an interference region occurs between two adjacent workpiece models.

As described above, in Step S5, the CPU 12 arranges the workpiece model $WM_n$ such that the position ranges $D_{n-1}$ and $D_n$ overlap with each other. Accordingly, when the CPU 12 randomly arranges the workpiece model $WM_n$ within the position range $D_n$ in the n-th Step S5, an interference region F may occur between the workpiece model $WM_n$ and the workpiece model $WM_{n-1}$, as illustrated in FIG. 13.

In this Step S7, the CPU 12 detects the interference region F based on e.g. profile data of the workpiece model $WM_n$ and the workpiece model $WM_{n-1}$ arranged in the virtual space 110.

If the CPU 12 detects the interference region F (i.e., determines YES), the CPU 12 proceeds to Step S8. On the other hand, if the CPU 12 does not detect the interference region F (i.e., determines NO), the CPU 12 proceeds to Step S10. Thus, in this embodiment, the CPU 12 functions as the interference detection section 58 (FIG. 1) configured to detect the interference region F.

In Step S8, the CPU 12 searches a non-interfering position where the interference region F does not occur for at least one of the workpiece model $WM_n$ and the workpiece model $WM_{n-1}$. Step S8 will be described with reference to FIG. 14.

After the start of Step S8, in Step S11, the CPU 12 shifts the position of at least one of the workpiece model $WM_n$ and the workpiece model $WM_{n-1}$ within the position range $D_n$ or $D_{n-1}$.

As an example, the CPU 12 changes the coordinate $x_n$ in the x-axis direction of the conveyor device coordinate system $C_C$ of the center $B_{1\_n}$ of the workpiece model $WM_n$ illustrated in FIG. 13 (e.g., $x_n+\alpha$, or $x_n-\alpha$), so as to fall within the position range $D_n$ (e.g., the closed interval $[x_{MIN}, x_{MAX}]$).

Alternatively, the CPU 12 changes the coordinate $y_n$ in the y-axis direction of the conveyor device coordinate system $C_C$ of the center $B_{1\_n}$ of the workpiece model $WM_n$ (e.g., $y_n+\alpha$, or $y_n-\alpha$), so as to fall within the position range $D_n$ (e.g., the closed interval $[y_{MIN}, y_{MAX}]$).

Alternatively, the CPU 12 rotates the workpiece model $WM_n$ by a predetermined angle (e.g., $+\alpha$ or $-\alpha$) about the axis $O_1$, so as to fall within the position range $D_n$ (e.g., the closed interval $[\theta_{MIN}, \theta_{MAX}]$).

As another example, the CPU 12 changes the coordinate $x_{n-1}$ in the x-axis direction of the conveyor device coordinate system $C_C$ of the center $B_{1\_n-1}$ of the workpiece model $WM_{n-1}$ illustrated in FIG. 13 (e.g., $x_{n-1}+\alpha$, or $x_{n-1}-\alpha$) so as to fall within the position range $D_{n-1}$.

Alternatively, the CPU 12 changes the coordinate $y_{n-1}$ in the y-axis direction of the conveyor device coordinate system $C_C$ of the center of the workpiece model $WM_{n-1}$ (e.g., $y_{n-1}+\alpha$, or $y_{n-1}-\alpha$) so as to fall within the position range $D_{n-1}$.

Alternatively, the CPU 12 rotates the workpiece model $WM_{n-1}$ by a predetermined angle (e.g., $+\alpha$ or $-\alpha$) about the axis $O_1$ so as to fall within the position range $D_{n-1}$. As still another example, the CPU 12 may change the positions of both the workpiece models $WM_n$ and $WM_{n-1}$ with using the above-described method.

By executing such a process, the CPU 12 changes the relative position of the two workpiece models $WM_n$ and $WM_{n-1}$. Thus, in this embodiment, the CPU 12 functions as the position change section 64 (FIG. 1) configured to change the relative position of the two workpiece models $WM_n$ and $WM_{n-1}$.

In Step S12, by means of similar method as the above-mentioned step S7, the CPU 12 determines whether the interference region F occurs between the workpiece models $WM_n$ and $WM_{n-1}$, the position of which has been shifted in Step S11.

If the CPU 12 determines that the interference region F occurs (i.e., determines YES), the CPU 12 returns to Step S11. On the other hand, if the CPU 12 determines that the interference region F does not occur (i.e., determines NO), the CPU 12 ends Step S8 illustrated in FIG. 14, and proceeds to Step S9 in FIG. 4. Thus, in this embodiment, the CPU 12 functions as the interference determination section 66 (FIG. 1) configured to determine whether the interference region F occurs.

As described above, the CPU 12 executes a loop of Steps S11 and S12 until it determines NO in Step S12 (i.e., until the interference region F is no longer detected). By executing Step S8, the CPU 12 searches a non-interfering position where the interference region F does not occur between the workpiece model $WM_n$ and the workpiece model $WM_{n-1}$.

Accordingly, the CPU 12 functions as the non-interfering position search section 60 (FIG. 1) configured to search the non-interfering position. Further, the position change section 64 that executes Step S11 and the interference determination section 66 that executes Step S12 constitutes the non-interfering position search section 60.

Figure 14:
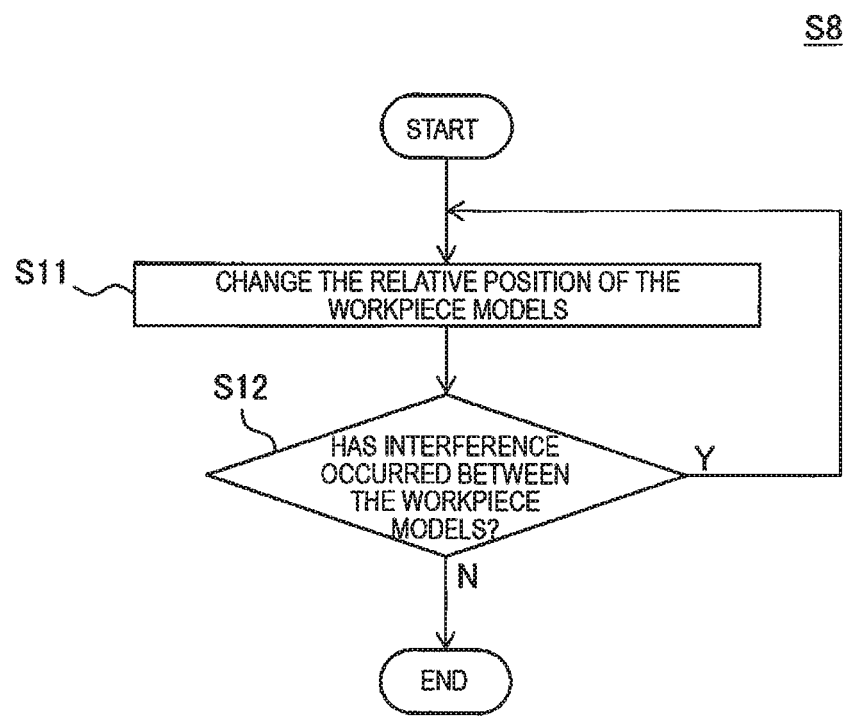
FIG. 14 is a flowchart illustrating an example of the flow of Step S8 in FIG. 4.

Note that, the CPU 12 may execute the flow illustrated in FIG. 14 in parallel with the convey operation started in Step S4 while the convey operation is being carried out. Alternatively, the CPU 12 may temporarily stop the convey operation started in Step S4 when the CPU 12 determines YES in Step S7, and then execute the flow illustrated in FIG. 14. In this case, the CPU 12 may restart the convey operation at the end of Step S9 described later.

In addition, when the CPU 12 repeatedly executes Step S11 until it determines NO in Step S12, the CPU 12 may execute the operations of shifting at least one of the workpiece models $WM_n$ and $WM_{n-1}$ in the x-axis direction of the conveyor device coordinate system $C_C$, shifting at least one of the workpiece models $WM_n$ and $WM_{n-1}$ in the y-direction of the conveyor device coordinate system $C_C$, and rotating at least one of the workpiece models $WM_n$ and $WM_{n-1}$ about the axis $O_1$, in a predetermined order. The order and the displacement amount $\alpha$ when executing these operations may be predetermined by the operator.

Further, in Step S11, the CPU 12 may calculate a direction in which the workpiece model $WM_n$ and the workpiece model $WM_{n-1}$ separate away from each other, and determine this separating direction as the direction in which at least one of the workpiece models $WM_n$ and $WM_{n-1}$ is to be shifted.

Referring again to FIG. 4, in Step S9, the CPU 12 corrects the position of at least one of the workpiece models $WM_n$ and $WM_{n-1}$. In particular, the CPU 12 determines the position of at least one of the workpiece models $WM_n$ and $WM_{n-1}$ as the non-interfering position searched in Step S8 (i.e., the position when determined NO in Step S12).

As a result, the positions of the workpiece models $WM_n$ and $WM_{n-1}$ are corrected from the positions when determined YES in Step S7 to the non-interfering positions in which the interference region F does not occur. In this way, the CPU 12 functions as the workpiece position correction section 62 (FIG. 1) configured to correct the position of at least one of the workpiece models $WM_n$ and $WM_{n-1}$.

In Step S10, the CPU 12 determines whether the total number "n" incremented in Step S6 reaches the total number $N_T$ set in Step S2 (i.e., whether $n=n_T$).

When the CPU 12 determines that $n=n_T$ (i.e., determines YES), it ends the simulation started in Step S4, thereby ends the flow illustrated in FIG. 4. On the other hand, when the CPU 12 determines that $n<n_T$ (i.e., determines NO), it returns to Step S5.

As described above, in this embodiment, the CPU 12 randomly changes the position (i.e., the position in the x-axis and y-axis of the conveyor device coordinate system $C_C$) and orientation (the angle $\theta$ about the axis $O_1$) when arranging the workpiece model WM on the conveying section model 104M.

Then, the CPU 12 detects whether the interference region E occurs when the workpiece model $WM_n$ is arranged (Step S7), and searches the non-interfering position for the workpiece model WM (Step S8) if the interference region E occurs. Then, the CPU 12 corrects the position of the workpiece model WM to the searched non-interfering position (Step S9).

According to this configuration, it is possible to simulate the operation of the conveyor device 100 in the real space as described with reference to FIG. 2 and FIG. 3 in a manner close to actual operation, while preventing occurrence of the interference region E.

Further, in this embodiment, the first offset amount $x_{OFF}$, the second offset amount $y_{OFF}$, and the third offset amount $\theta_{OFF}$ are set as the offset amount. According to this configuration, since the position and orientation when arranging the workpiece model WM on the conveying section model 104M can be varyingly changed, it is possible to simulate the operation of the conveyor device 100 in a manner closer to actual operation.

Further, in this embodiment, the CPU 12 changes the relative position of the two workpiece models WM (Step S11) when detecting the occurrence of the interference region E in Step 7, and then, determines whether the two workpiece models WM interfere with each other (Step S12), thereby searches the non-interfering position. According to this configuration, it is possible to reliably search the non-interfering position with a relatively simple algorithm.

Figure 15:
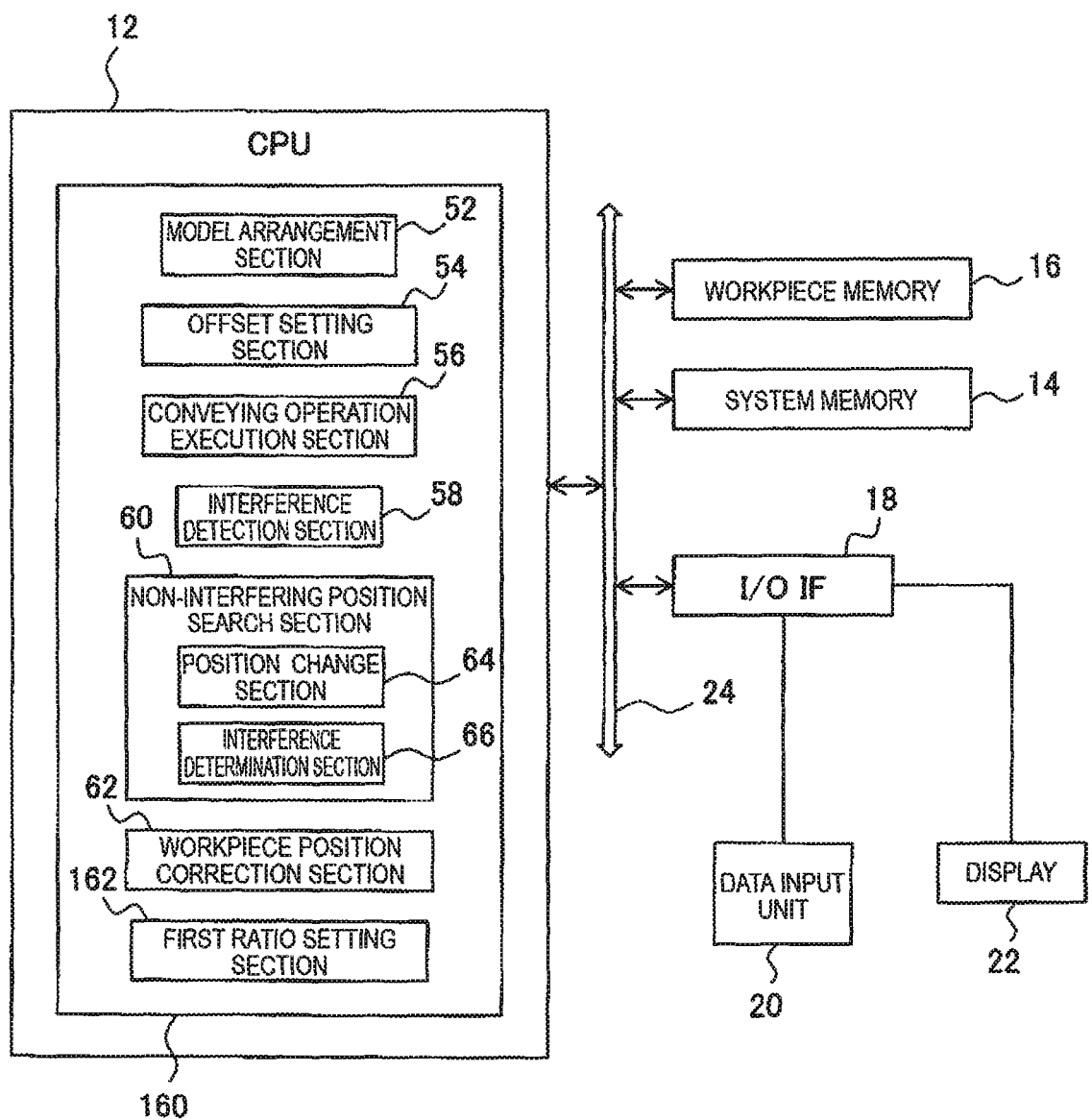
FIG. 15 is a block diagram of a simulation system according to another embodiment.

Next, a simulation system 150 according to another embodiment will be described with reference to FIG. 15. The simulation system 150 differs from the above-described simulation system 10 in the simulation device 160.

The simulation device 160 includes the model arrangement section 52, the offset setting section 54, the conveying operation execution section 56, the interference detection section 58, the non-interfering position search section 60, the workpiece position correction section 62, and a first ratio setting section 162.

The CPU 12 may carry out the functions of the model arrangement section 52, the offset setting section 54, the conveying operation execution section 56, the interference detection section 58, the non-interfering position search section 60, the workpiece position correction section 62, and the first ratio setting section 162.

Figure 16:
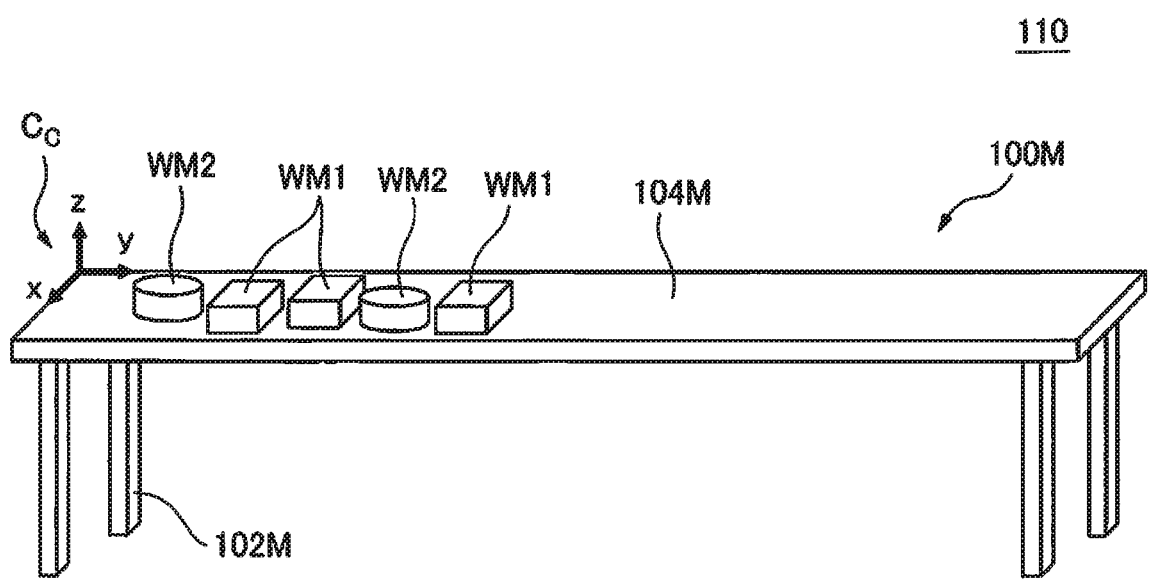
FIG. 16 illustrates a state in which a first type of workpiece model and a second type of workpiece model are arranged in the virtual space.

As illustrated in FIG. 16, in this embodiment, the CPU 12 arranges in the virtual space 110 a first type of workpiece model WM1 and a second type of workpiece model WM2 having a shape different from the first type of workpiece model WM1. The first type of workpiece model WM1 has a substantially rectangular solid shape similar to the above-described workpiece model WM, while the second type of workpiece model WM2 has a substantially circular-cylinder solid shape.

Figure 17:
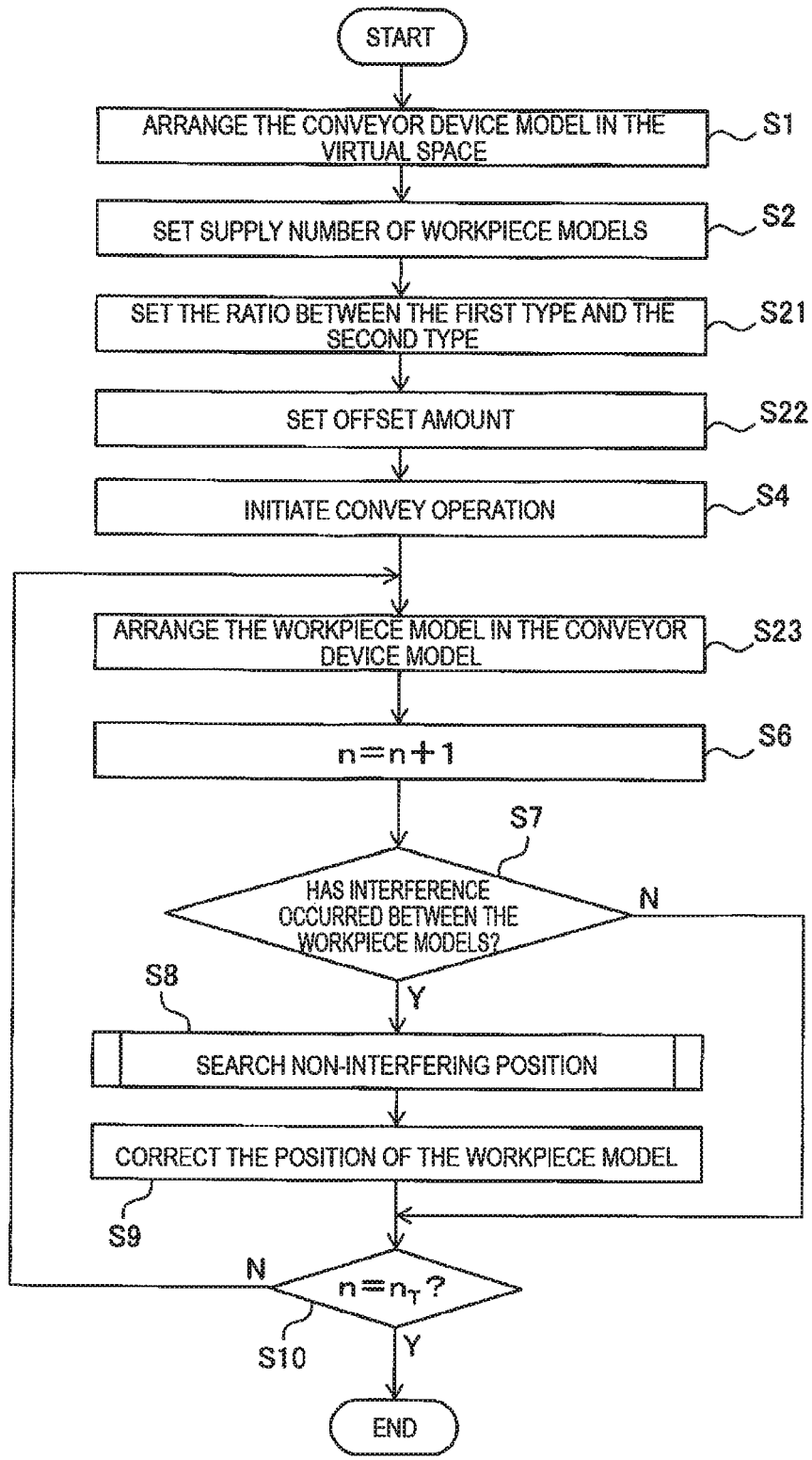
FIG. 17 is a flowchart illustrating an example of an operation flow of the simulation system illustrated in FIG. 15.

Next, the operation of the simulation system 150 will be described with reference to FIG. 17. Note that, in the flow illustrated in FIG. 17, processes similar to those in the flow illustrated in FIG. 4 are assigned the same step numbers, and detailed descriptions thereof will be omitted.

After Step S2, in Step S21, the CPU 12 sets a ratio $R_1$ of the number "$n_a$" of the first type of workpiece models WM1 and the number "$n_b$" of the second type of workpiece models WM2 (i.e., $R_1=n_a/n_b$) when arranging the workpiece models WM in the virtual space 110 at the following Step S23.

As an example, the CPU 12 generates input image data for enabling the operator to input the ratio $R_1$, and display it on the display 22. The operator operates the data input unit 20 so as to input a desired ratio $R_1$ into the input image displayed on the display 22.

The data input unit 20 transmits the input data of the ratio $R_1$ input by the operator to the CPU 12 via the I/O interface 18. The CPU 12 sets the ratio $R_1$ in accordance with the received input data, and store the setting of the ratio $R_1$ in the system memory 14.

Thus, in this embodiment, the CPU 12 functions as the first ratio setting section 162 (FIG. 15) configured to set the ratio $R_1$ of the first type of workpiece model WM1 and the second type of workpiece model WM2.

In Step S22, the CPU 12 functions as the offset setting section 54 to set the offset amount when arranging the workpiece models on the conveyor device model 100M in the virtual space 110.

In particular, similar to the above-described embodiment, the CPU 12 receives from the operator the first offset amount $x_{OFF}$, the second offset amount $y_{OFF}$, and the third offset amount $\theta_{OFF}$, as the offset amount for the first type of workpiece model WM1, and set the first offset amount $x_{OFF}$, the second offset amount $y_{OFF}$, and the third offset amount $\theta_{OFF}$.

Further, the CPU 12 receives from the operator the first offset amount $x_{OFF}$ and the second offset amount $y_{OFF}$, as the offset amount for the second type of workpiece model WM2, and set the first offset amount $x_{OFF}$ and the second offset amount $y_{OFF}$. Since the second type of workpiece model WM2 is circular when viewed from the z-axis direction of the conveyor device coordinate system $C_C$, there is no need to set the third offset amount $\theta_{OFF}$ relating to the angle about the axis $O_1$.

After Step S4, in Step S23, the CPU 12 functions as the model arrangement section 52, and arranges the workpiece models on the conveyor device model 100M in the virtual space 110.

At this time, the CPU 12 selects the first type of workpiece model WM1 or the second type of workpiece model WM2 in accordance with the ratio $R_1$ set in Step S2, and arrange it on the conveying section model 104M.

For example, if the total number $n_T$ set in Step S2 is 100 ($n_T=100$) and the ratio $R_1$ set in Step S21 is $R_1=n_a/n_b=3/2$, the CPU 12 selects and arranges either the first type of workpiece model WM1 or the second type of workpiece model WM2 so as to supply 60 of the first type of workpiece models WM1 and 40 of the second type of workpiece models WM2 in the virtual space 110, until the CPU 12 determines YES in Step S10.

When arranging the first type of workpiece model WM1, the CPU 12 randomly changes the position and orientation of the first type of workpiece model WM1 within the position range D (e.g., the closed interval [$x_{MIN}$, $x_{MAX}$], [$y_{MIN}$, $y_{MAX}$], [$\theta_{MIN}$, $\theta_{MAX}$]) determined by the offset amount set in Step S3.

Further, when arranging the second type of workpiece model WM2, the CPU 12 randomly changes the position and orientation of the second type of workpiece model WM2 within the position range D (e.g., the closed interval [$x_{MIN}$, $x_{MAX}$], [$y_{MIN}$, $y_{MAX}$]) determined by the offset amount set in Step S3.

In this way, according to this embodiment, it is possible to simulate the operation of conveying different types of workpiece by the conveyor device 100 in a manner closer to actual operation.

Figure 18:
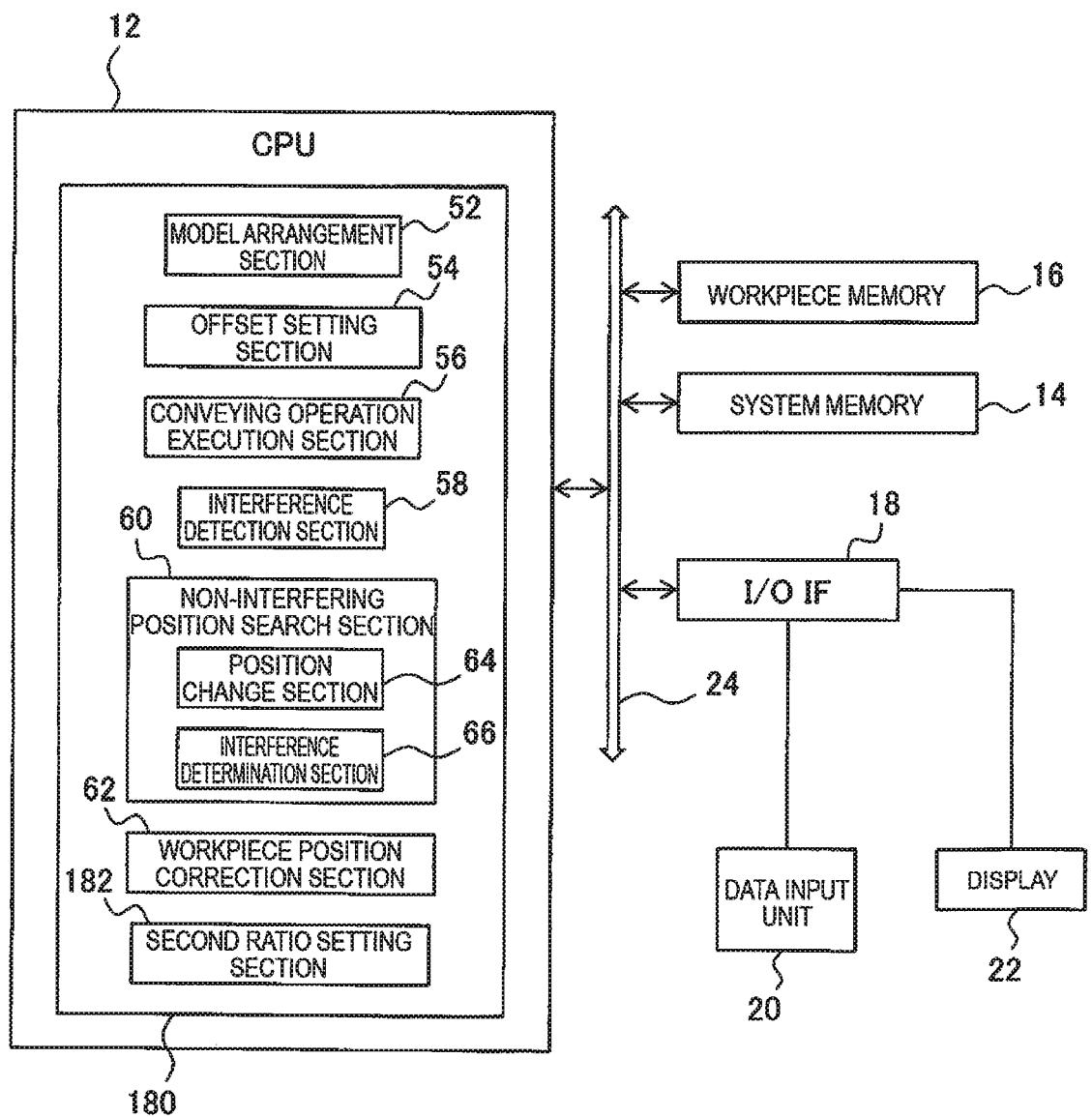
FIG. 18 is a block diagram of a simulation system according to still another embodiment.

Next, a simulation system 170 according to still another embodiment will be described with reference to FIG. 18. The simulation system 170 differs from the above-described simulation system 10 in the simulation device 180.

The simulation device 180 includes the model arrangement section 52, the offset setting section 54, the conveying operation execution section 56, the interference detection section 58, the non-interfering position search section 60, the workpiece position correction section 62, and a second ratio setting section 162.

The CPU 12 functions as the model arrangement section 52, the offset setting section 54, the conveying operation execution section 56, the interference detection section 58, the non-interfering position search section 60, the workpiece position correction section 62, and the second ratio setting section 182.

Figure 19:
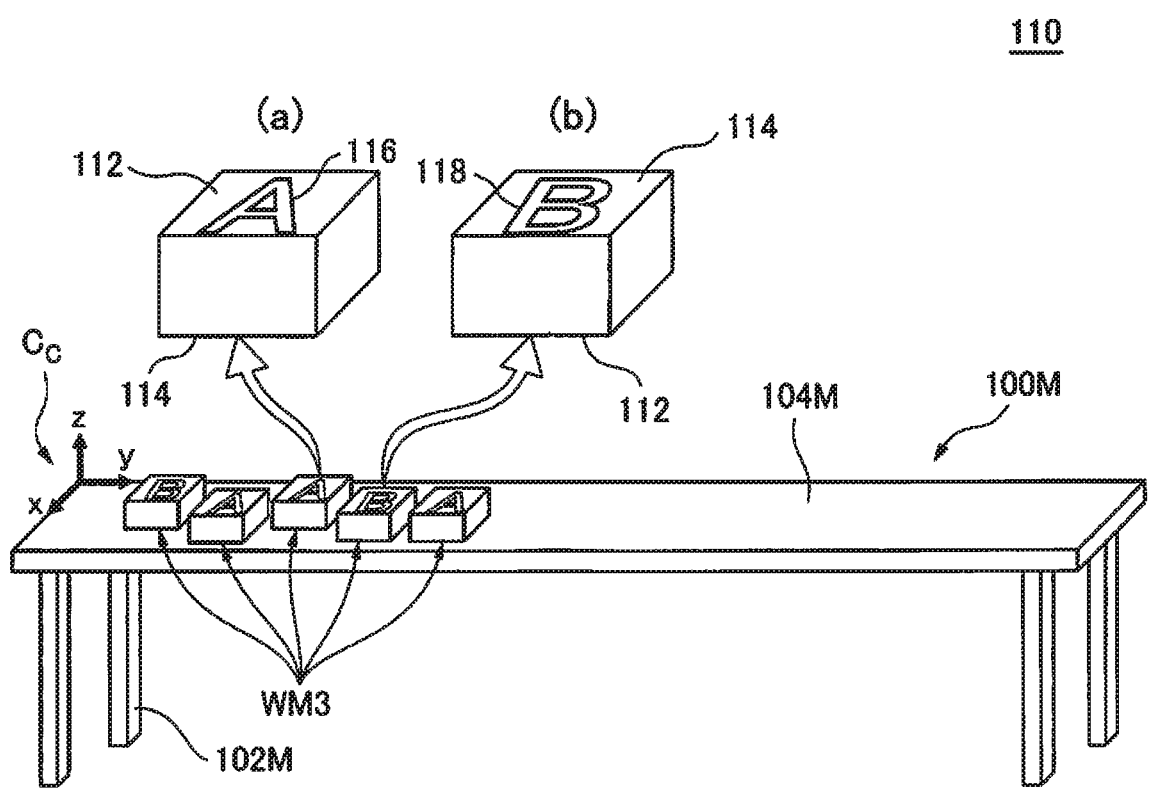
FIG. 19 illustrates a workpiece model arranged such that the front surface thereof is visible and a workpiece model arranged such that the back surface thereof is visible.

As illustrated in FIG. 19, in this embodiment, the CPU 12 arranges a workpiece model WM3 in the virtual space 110. The workpiece model WM3 has a substantially rectangular solid shape, and includes a front surface 112 and a back surface 114 opposite the front surface 112. A pattern 116 of character "A" is formed on the front surface 112, while a pattern 118 of character "B" is formed on the back surface 114.

Figure 20:
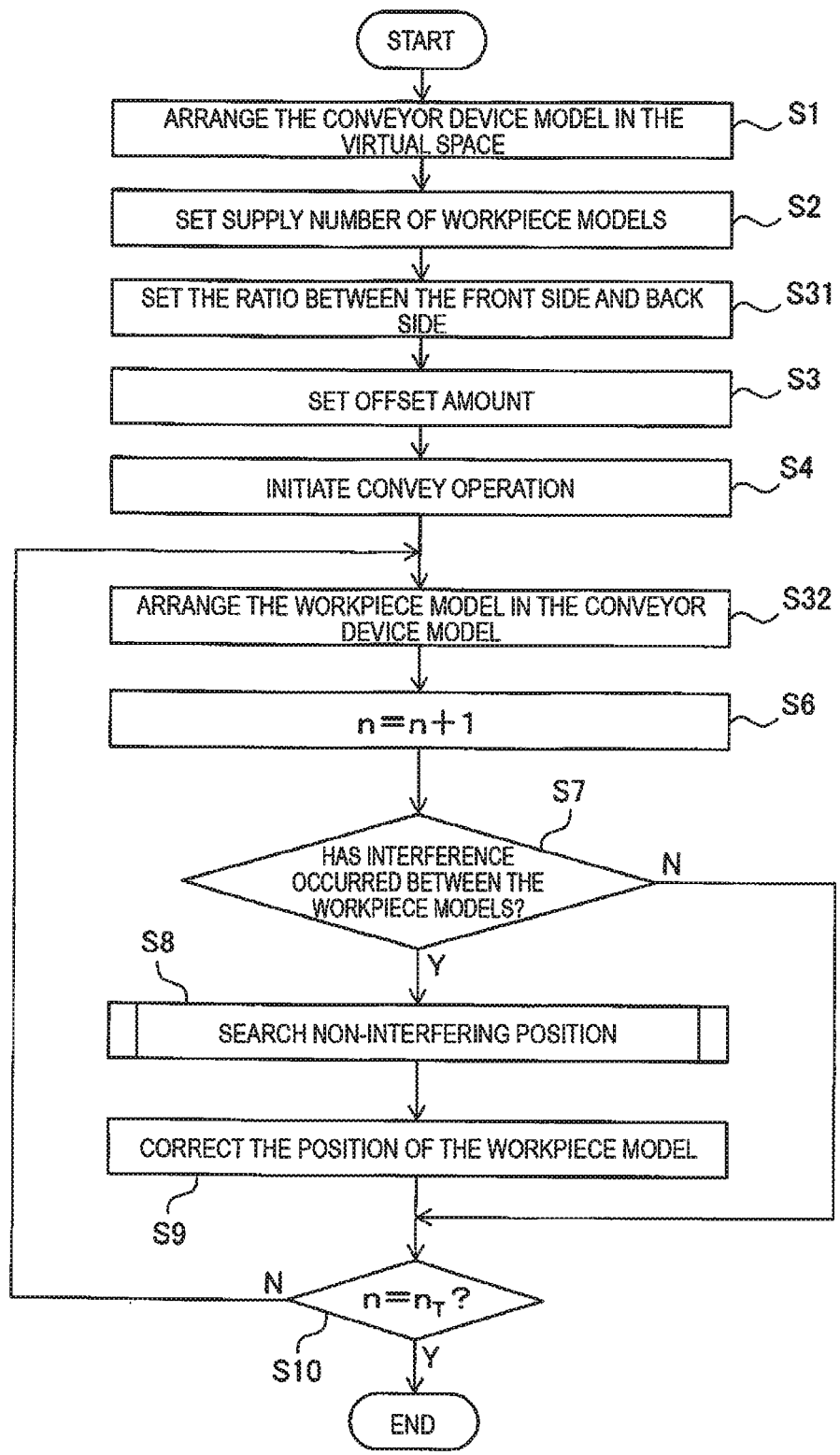
FIG. 20 is a flowchart illustrating an example of an operation flow of the simulation system illustrated in FIG. 18.

Next, the operation of the simulation system 170 will be described with reference to FIG. 20. Note that, in the flow illustrated in FIG. 20, processes similar to those in the flow shown in FIG. 4 are assigned the same step numbers, and detailed descriptions thereof will be omitted.

After Step S2, in Step S31, the CPU 12 sets a ratio $R_2$ of the number of times "$n_c$", for which the workpiece model WM3 are arranged on the conveyor device model 104M such that the front surfaces 112 are visible (i.e., the front surfaces 112 faces the side opposite the conveyor device model 100M) as illustrated in Section (a) in FIG. 19, and the number of times "$n_d$", for which the workpiece models WM3 are arranged on the conveyor device model 104M such that the back surfaces 114 are visible as illustrated in Section (b) in FIG. 19 (i.e., $R_2=n_c/n_d$), when arranging the workpiece models WM3 in the virtual space 110 in the following Step S32.

As an example, the CPU 12 generates input image data for enabling the operator to input the ratio $R_2$, and display it on the display 22. The operator operates the data input unit 20 so as to input a desired ratio $R_2$ into the input image displayed on the display 22.

The data input unit 20 transmits the input data of the ratio $R_2$ input by the operator to the CPU 12 via the I/O interface 18. The CPU 12 sets the ratio $R_2$ in accordance with the received input data, and store the setting of the ratio $R_2$ in the system memory 14. Thus, in this embodiment, the CPU 12 functions as the second ratio setting section 182 (FIG. 18) configured to set the ratio $R_2$.

After Step S4, in Step S32, the CPU 12 functions as the model arrangement section 52, and arranges the workpiece model WM3 in the conveyor device model 100M in the virtual space 110.

At this time, in accordance with the ratio $R_2$ set in Step S31, the CPU 12 selects whether to arrange the workpiece model WM3 on the conveyor device model 100M such that the front surface 112 is visible, or to arrange the workpiece model WM3 on the conveyor device model 100M such that the back surface 114 is visible.

For example, if the total number $n_T$ set in Step S2 is 100 ($n_T$=100) and the ratio $R_2$ set in Step S31 is $R_2=n_c/n_d=3/2$, the CPU 12 arranges 60 of the workpiece models WM3 such that the front surfaces 112 thereof are visible, and arranges 40 of the workpiece models WM3 such that the back surfaces 114 thereof are visible, until the CPU 12 determines YES in Step S10.

In this way, according to this embodiment, it is possible to simulate the operation of conveying workpieces, each of which has a front surface and back surface, by the conveyor device 100 in a manner closer to actual operation.

Figure 21:
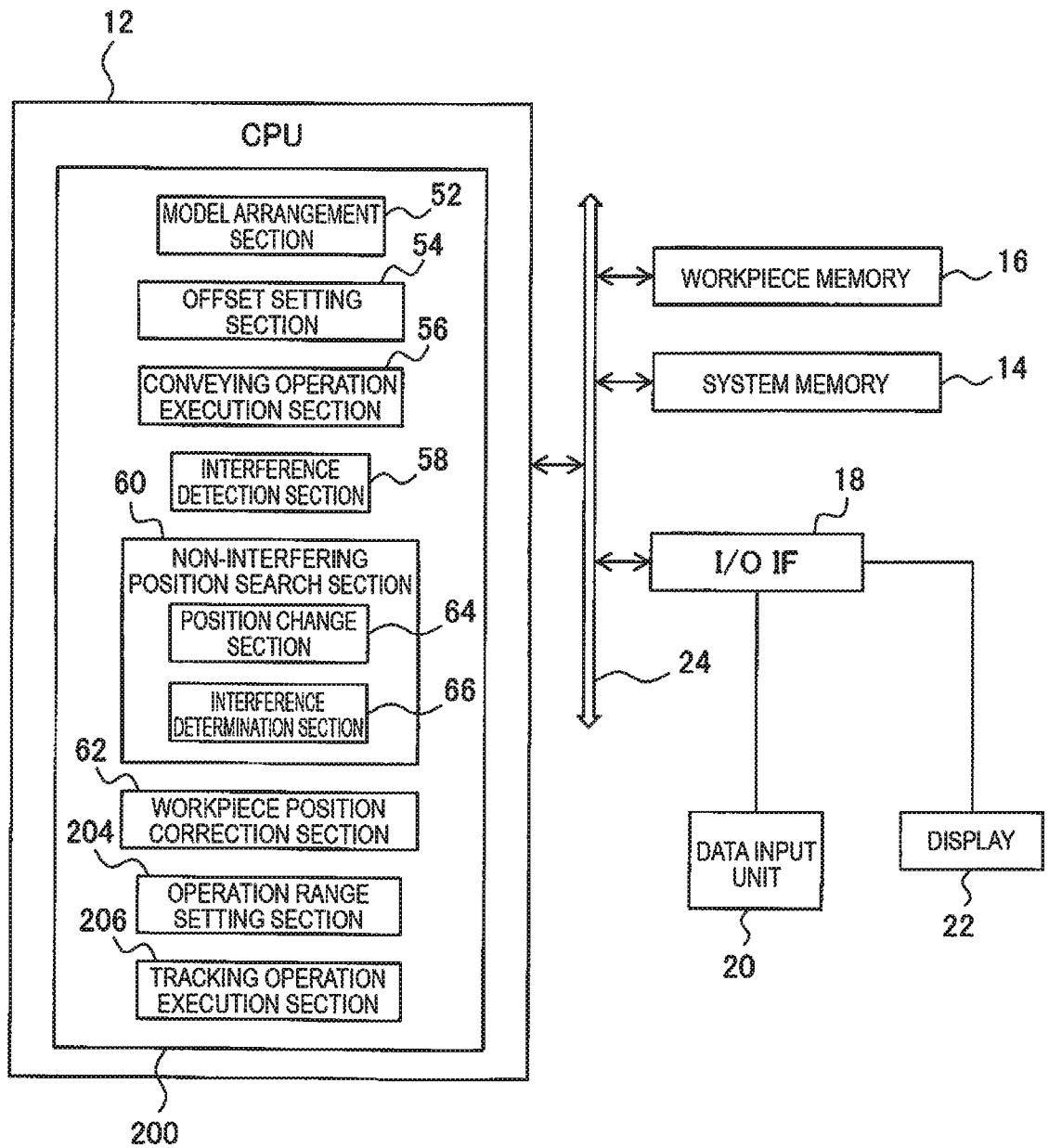
FIG. 21 is a block diagram of a simulation system according to a still another embodiment.

Next, a simulation system 190 according to another embodiment will be described with reference to FIG. 21. The simulation device 190 differs from the above-described simulation system 10 in the simulation device 200.

The simulation device 200 includes the model arrangement section 52, the offset setting section 54, the conveying operation execution section 56, the interference detection section 58, the non-interfering position search section 60, the workpiece position correction section 62, an operation range setting section 204, and a tracking operation execution section 206.

The CPU 12 functions as the model arrangement section 52, the offset setting section 54, the conveying operation execution section 56, the interference detection section 58, the non-interfering position search section 60, the workpiece position correction section 62, the operation range setting section 204, and the tracking operation execution section 206.

The simulation device 200 is for simulating the operation of a robot system configured to track and hold a workpiece conveyed by a conveyor device with a robot hand.

Figure 22:
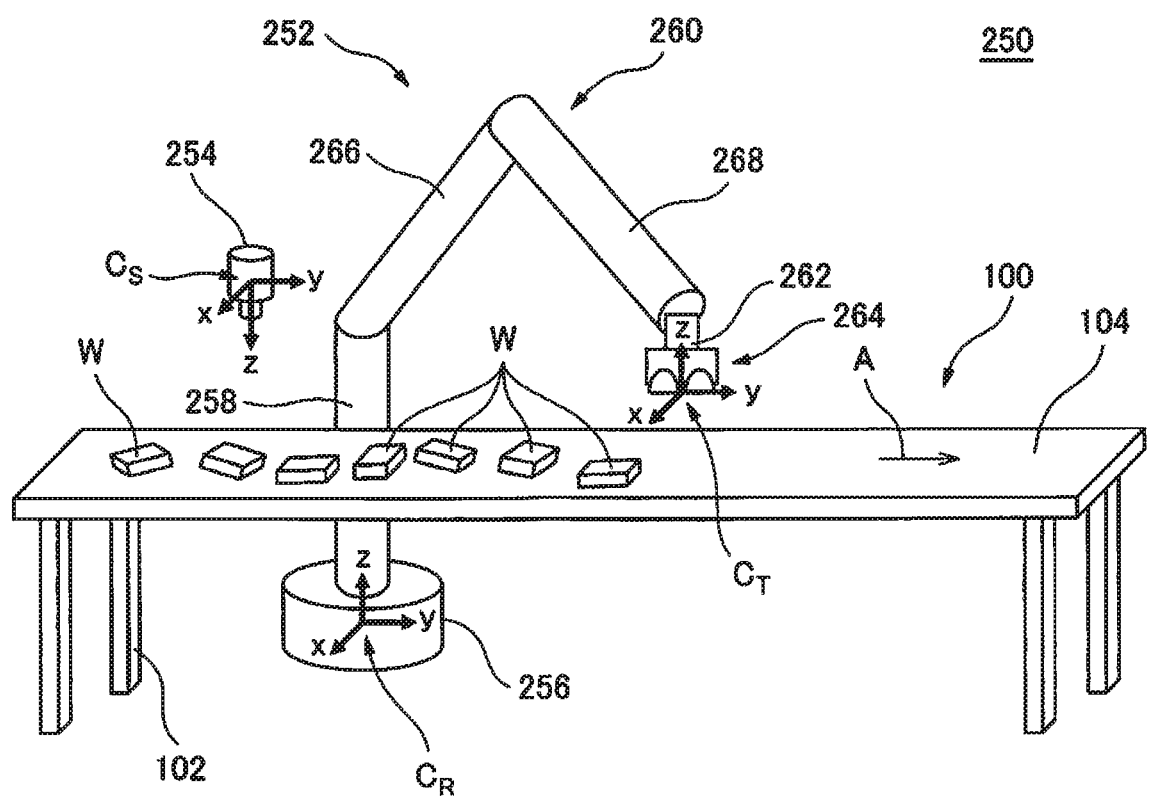
FIG. 22 illustrates an example of a workpiece convey system in a real space.

An example of a robot system 250 in the real space will be described with reference to FIG. 22. The robot system 250 includes the conveyor device 100, a robot 252, and a sensor 254.

The robot 252 is a vertical articulated robot, and includes a robot base 256, a rotating torso 258, a robot arm 260, a wrist 262, and a robot hand 264. The robot base 256 is fixed on a floor of a working cell in the real space.

The rotating torso 258 is rotatably provided at the robot base 256. The robot arm 260 includes an upper arm 266 rotatably connected to the rotating torso 258 and a forearm 268 rotatably connected to a distal end of the upper arm 266.

The wrist 262 is connected to a distal end of the forearm 268 and supports the robot hand 264 so as to be rotatable about 3 axes. The robot hand 264 includes e.g. a plurality of openable and closable fingers or a suction part, and be capable of releasably holding a workpiece W.

A robot coordinate system $C_R$ is set for the robot 252. The robot 252 operates each component of the robot 252 with reference to the robot coordinate system $C_R$. For example, the z-axis of the robot coordinate system $C_R$ is arranged parallel to the vertical direction of the real space, and the rotating torso 258 is rotated about the z-axis of the robot coordinate system $C_R$.

A tool coordinate system $C_T$ is set for the robot hand 264. The tool coordinate system $C_T$ defines the position and orientation of the robot hand 264 in the robot coordinate system $C_R$.

The robot 252 operates the rotating torso 258, the robot arm 260, and the wrist 262 in the robot coordinate system $C_R$ such that the position and orientation of the robot hand 264 coincide with those defined by the tool coordinate system $C_T$.

The sensor 254 is installed vertically upward of the conveying section 104, and can detect the workpiece W conveyed by the conveying section 104. The sensor 254 is e.g. a three-dimensional vision sensor, and configured to image the workpiece W to acquire the image of the workpiece W.

A sensor coordinate system $C_S$ is set for the sensor 254. For example, the sensor coordinate system $C_S$ is set such that the z-axis positive direction thereof coincides with the line-of-sight direction of the sensor 254 and with the vertically downward direction in the real space.

Next, the operation of the robot system 250 will be described. First, a workpiece W is placed near the upstream end of the conveying section 104 by an operator. Then, the conveyor device 100 operates the conveying section 104 so as to convey the workpiece W placed on the conveying section 104 in the conveying direction A.

Then, the sensor 254 detects the workpiece W placed on the conveying section 104. In particular, the sensor 254 images the workpiece W on the conveying section 104, and acquire the image of the workpiece W.

Then, the robot 252 acquires the position and orientation of the workpiece W in the robot coordinate system $C_R$, based on the detected image of the workpiece W acquired by the sensor 254. Then, based on the acquired position and orientation, the robot 252 sets the tool coordinate system $C_T$ such that the origin of the tool coordinate system $C_T$ is continuously placed at a predetermined position of the conveyed workpiece W (e.g., the center of the workpiece W).

The robot 252 operates the rotating torso 258, the robot arm 260, and the wrist 262 so as to arrange the robot hand 264 at the position and orientation defined by the tool coordinate system $C_T$. In this way, the robot 252 causes the robot hand 264 to track the workpiece W being conveyed. Then, the robot 252 holds the workpiece W by the robot hand 264. As a result, the workpiece W being conveyed is lifted up by the robot hand 264.

The simulation device 200 according to this embodiment simulates such an operation of the robot system 250.

Figure 23:
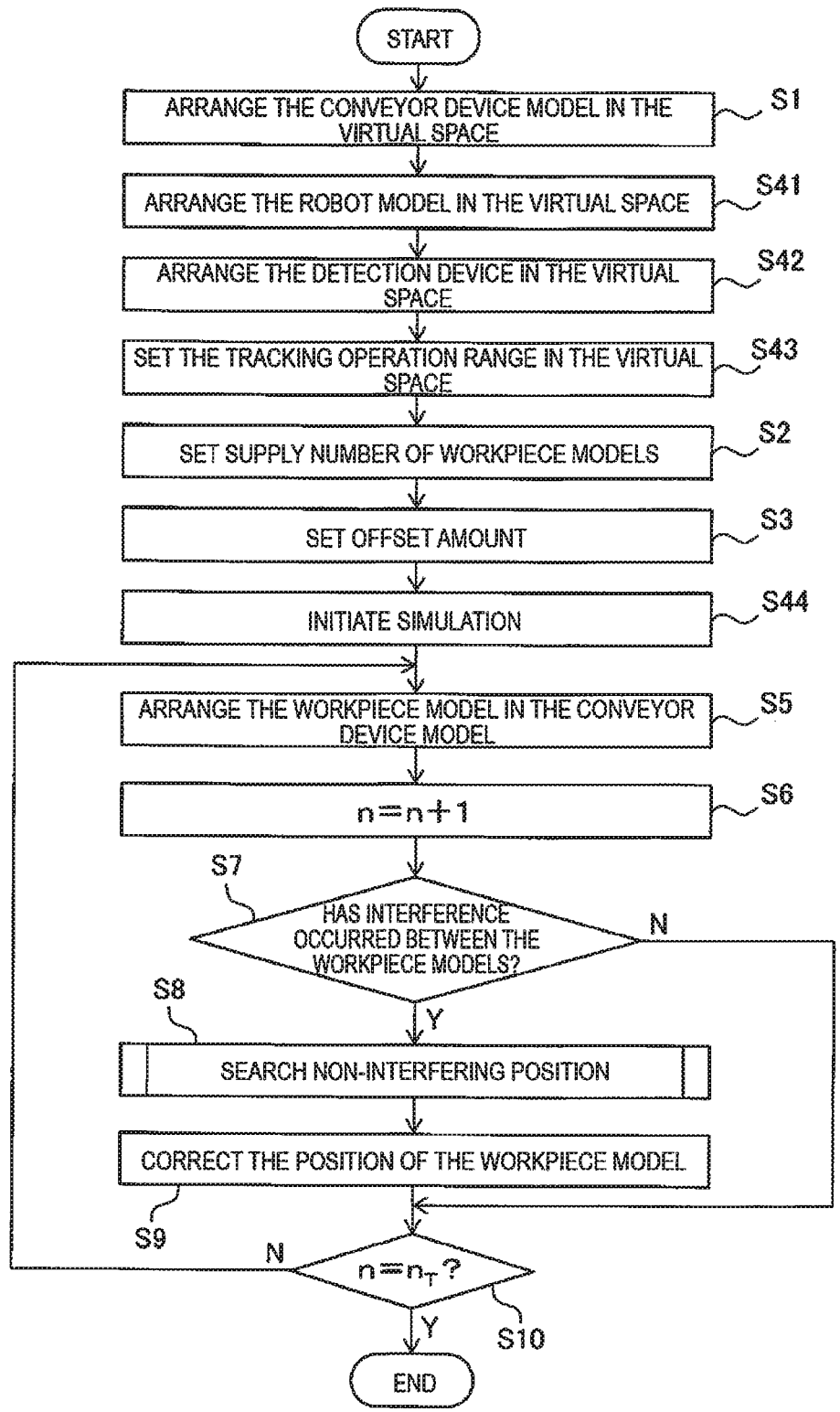
FIG. 23 is a flowchart illustrating an example of the operation flow of the simulation system illustrated in FIG. 21.

Next, the operation of the simulation system 190 will be described with reference to FIG. 23. Note that, in the flow illustrated in FIG. 23, processes similar to those of the flow illustrated in FIG. 4 are assigned the same step numbers, and detailed descriptions thereof will be omitted.

After Step S1, in Step S41, the CPU 12 functions as the model arrangement section 52, and arranges the robot model in the virtual space. The system memory 14 pre-stores robot models of a plurality of types of robots including the above-mentioned robot 252.

As an example, the CPU 12 generates image data representing a plurality of types of robot models stored in the system memory 14 in the form of a list, and displays it on the display 22. The user operates the data input unit 20 so as to select a desired robot model from the list displayed on the display 22.

Hereinafter, a case is described in which the user selects the robot model 252M (FIG. 24) that models the above-described robot 252. The data input unit 20 transmits the input data input by the user to the CPU 12 via the I/O interface 18.

In response to the received input data, the CPU 12 reads out the robot model 252M from the plurality of types of robot models stored in the system memory 14, and arrange it in the virtual space 110. Then, the CPU 12 generates the virtual space 110 as image data and display it on the display 22.

Figure 24:
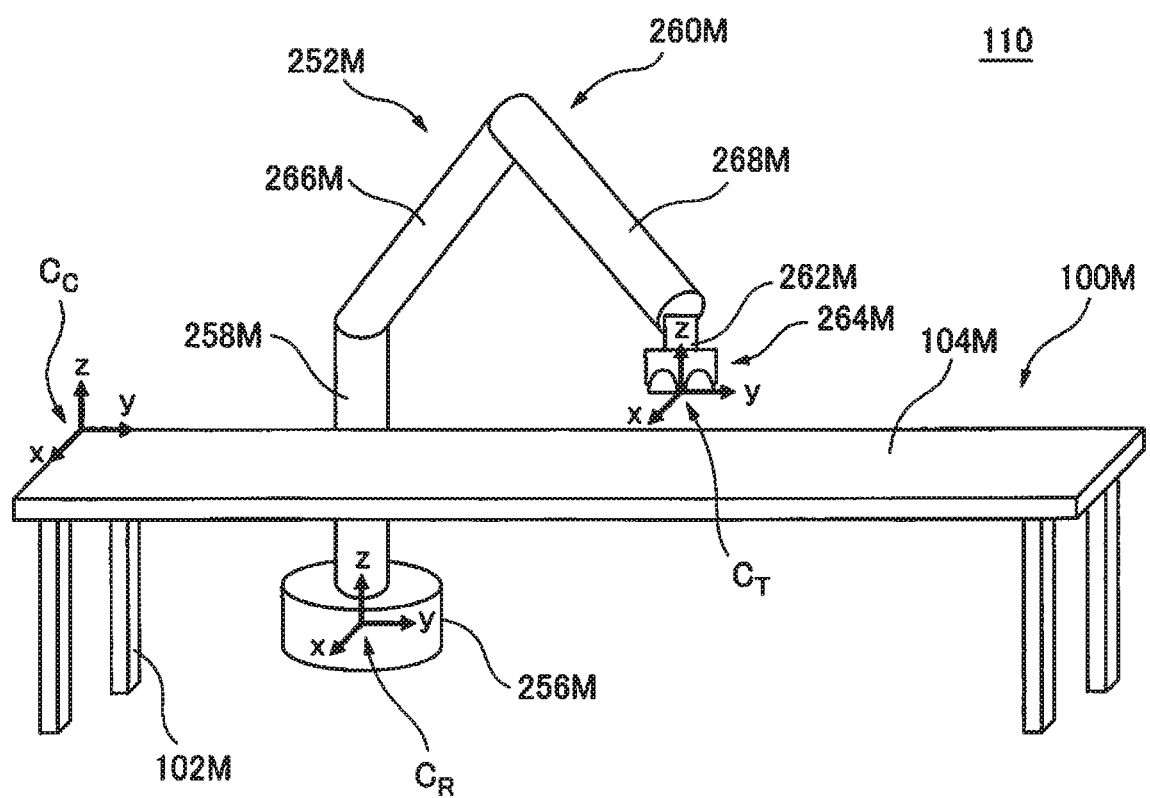
FIG. 24 illustrates an image of the virtual space generated in Step S41 of FIG. 23.

An example of the image of the virtual space 110 at this time is illustrated in FIG. 24. In the virtual space 110 illustrated in FIG. 24, the robot model 252M including a robot base model 256M, a rotating torso model 258M, a robot arm model 260M, a wrist model 262M, and a robot hand model 264M is arranged.

The system memory 14 stores various virtual robot operation parameters in association with the robot model 252M. The virtual robot operation parameters correspond to operation parameters necessary for operating the robot 252 in the real space. For example, the virtual robot operation parameters includes a robot coordinate system $C_R$, a tool coordinate system $C_T$, and a virtual motion range.

The virtual motion range is a range in the virtual space 110 that corresponds to a motion range in which the robot 252 can move the robot hand 264 in real space (i.e., a range in which the tool coordinate system $C_T$ can be set).

As illustrated in FIG. 24, the CPU 12 sets the robot coordinate system $C_R$ and the tool coordinate system $C_T$, together with the robot model 252M, in the virtual space 110. Thus, in this embodiment, the CPU 12 functions as the model arrangement section 52 so as to arrange the robot model 252M in the virtual space 110.

In Step S42, the CPU 12 functions as the model arrangement section 52, and arranges a sensor model in the virtual space 110. The system memory 14 pre-stores sensor models of a plurality of types of sensors including the above-described sensor 254.

As an example, the CPU 12 generates image data representing the plurality of types of sensor models stored in the system memory 14 in the form of a list, and display it on the display 22. The user operates the data input unit 20 so as to select a desired sensor model from the list displayed on the display 22.

Hereinafter, a case is described in which the user selects the sensor model 254M (FIG. 25) that models the above-described sensor 254. The data-input unit 20 transmits the input data input by the user to the CPU 12 via the I/O interface 18.

In response to the received input data, the CPU 12 reads out the sensor model 254M from the plurality of types of sensor models stored in the system memory 14, and arrange it in the virtual space 110. At this time, the CPU 12 arranges the sensor model 254M at upward (i.e., the z-axis positive direction of the conveyor device coordinate system $T_C$) of the conveying section model 104M.

Figure 25:
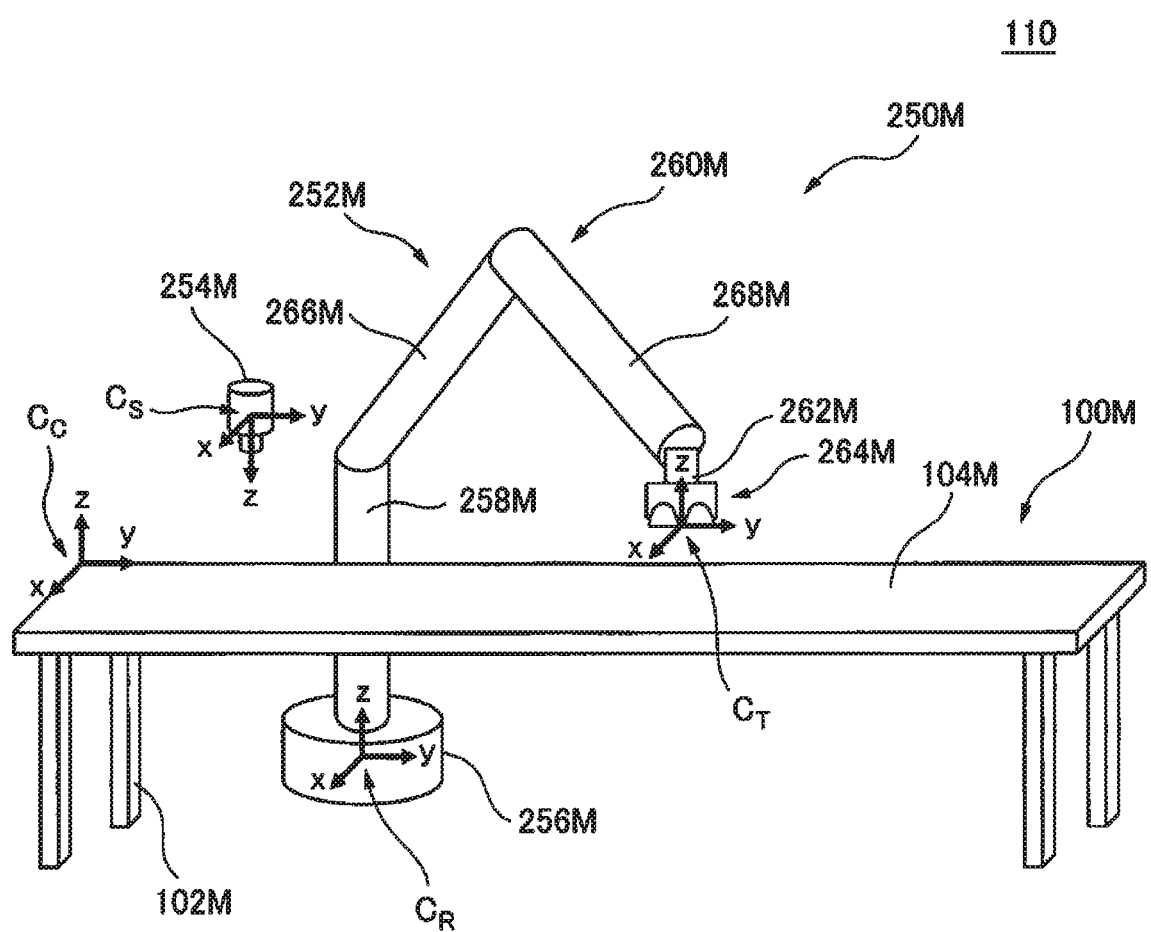
FIG. 25 illustrates an image of the virtual space generated in Step S42 of FIG. 23.

Along with this, the CPU 12 sets the sensor coordinate system $C_S$ in the virtual space 110. In this way, as illustrated in FIG. 25, the sensor model 254M is arranged in the virtual space 110. Thus, in this embodiment, the CPU 12 functions as the model arrangement section 52 so as to arrange the sensor model 254M in the virtual space 110.

As a result of this Step S42, a convey system model 250M including the conveyor device model 100M, the robot model 252M, and the sensor model 254M is structured in the virtual space 110.

In Step S43, the CPU 12 sets a tracking operation range in the virtual space 110. The tracking operation range is an operation range in the virtual space 110, in which the robot model 252M causes the robot hand model 264M to track the workpiece model WM conveyed by the conveyor device model 100M, when carrying out the simulation in the following Step S44.

As an example, the CPU 12 generates input image data to enable the user to input a distance G (FIG. 26) that defines the tracking operation range, and display it on the display 22. The distance G is a distance along the y-axis direction of the conveyor device coordinate system $C_C$. The user operates the data input unit 20 so as to input the desired distance G into the input image displayed on the display 22.

The data input unit 20 transmits the input data of the distance G input by the user to the CPU 12 via the I/O interface 18. In accordance with the received input data, the CPU 12 sets an upstream end 210 and a downstream end 212 of the tracking operation range on the conveying section model 104M.

At this time, the upstream end 210 is arranged downstream side of the sensor model 254M. In addition, the upstream end 210 and the downstream end 212 are arranged such that the virtual motion range of the robot model 252M are disposed between the upstream end 210 and the downstream end 212.

Figure 26:
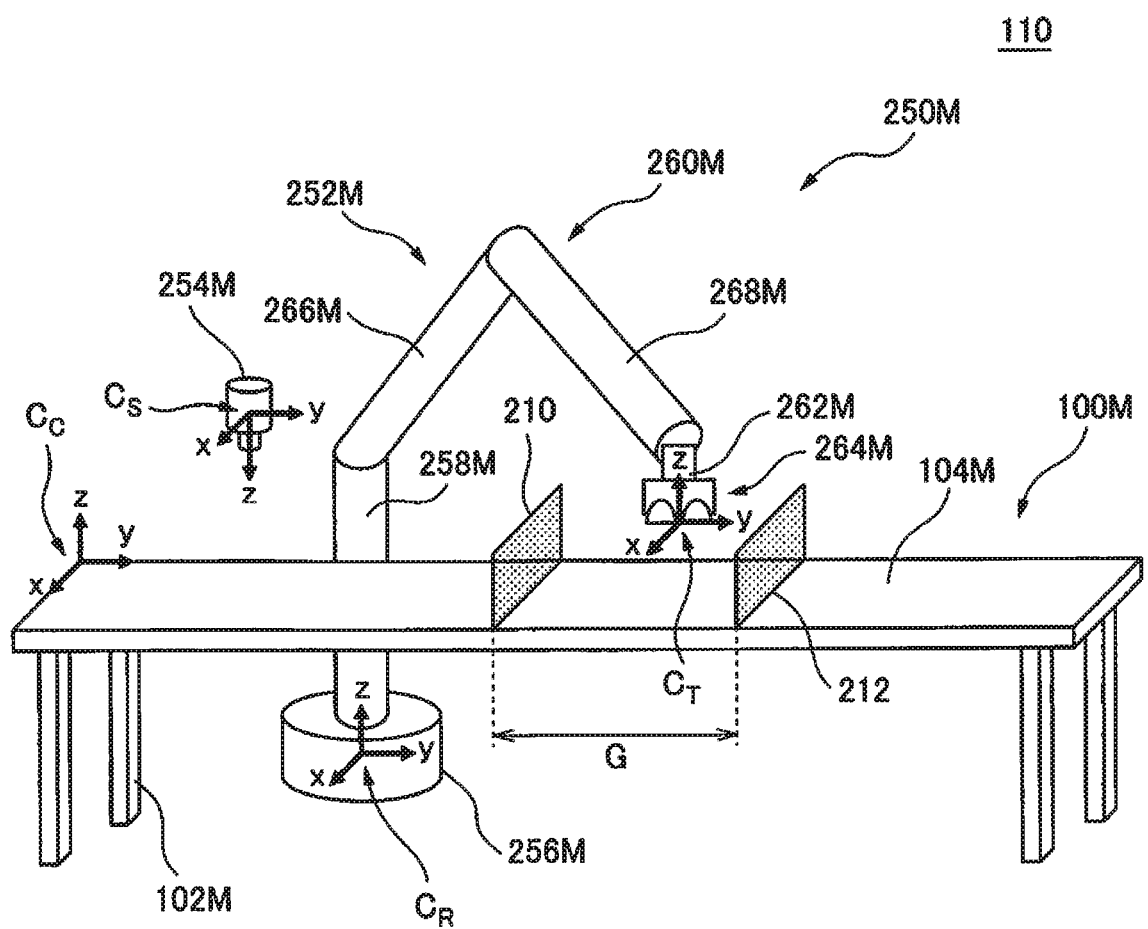
FIG. 26 is a diagram for explaining Step S43 in FIG. 23.

As a result, as illustrated in FIG. 26, the tracking operation range is set as a range between the upstream end 210 and the downstream end 212. Thus, in this embodiment, the CPU 12 functions as the operation range setting section 204 (FIG. 21) configured to set the tracking operation range in the virtual space 110.

Note that, when the tracking operation range is set, the CPU 12 may move the upstream end 210 or the downstream end 212 of the tracking operation range in the virtual space 110, in response to the input data from the data input unit 20.

For example, when the tracking operation range is set, the user operates the data input unit 20 (e.g., a mouse) so as to move the upstream end 210 or the downstream end 212 displayed on the display 22 (e.g., by drag and drop). In response to the input data from the data input unit 20 by the user, the CPU 12 moves the upstream end 210 or the downstream end in the virtual space 110.

Further, if the position of the sensor model 254M in the x-y plane of the conveyor device coordinate system $C_C$ falls within the tracking operation range as a result of moving the upstream end 210 or the downstream end 212 in response to the input data by the user, the movement of the upstream end 210 or the downstream end 212 may be prohibited, or a warning image may be displayed on the display 22.

Further, if the virtual motion range of the robot model 252M is out of the tracking operation range as a result of moving the upstream end 210 or the downstream end 212 in response to the input data by the user, the movement of the upstream end 210 or the downstream end 212 may be prohibited or a warning image may be displayed on the display 22.

In Step S44, the CPU 12 starts the simulation of the operation of the convey system model 250M. In particular, the CPU 12 functions as the conveying operation execution section 56, and simulatively operates the conveyor device model 100M and conveys the workpiece model WM when the workpiece model WM is arranged on the conveying section model 104M in the following Step S5.

Then, the CPU 12 simulatively operates the sensor model 254M in the virtual space 110, and the sensor model 254M detects the workpiece model WM being conveyed. The CPU 12 generates a virtual detected image (virtual detected result), which is to be obtained when the sensor model 254M detects the workpiece model WM in the virtual space 110, based on the line-of-sight data of the sensor model 254M and the arrangement information of the workpiece model WM.

Then, the CPU 12 acquires the position and orientation of the workpiece model WM in the robot coordinate system $C_R$ from the generated virtual detected image. Then, based on the acquired position and orientation of the workpiece model WM, the tracking operation range set in Step S43, and the robot program, the CPU 12 simulatively operates the robot model 252M in the virtual space 110.

In particular, the CPU 12 sequentially sets the tool coordinate system $C_T$ such that the origin of the tool coordinate system $C_T$ is continuously arranged at a predetermined position (e.g., the center) of the workpiece model being conveyed.

The CPU 12 operates the robot model 252M in the virtual space 110 so as to arrange the robot hand model 264M at the position and orientation defined by the tool coordinate system $C_T$.

In this way, the robot model 252M causes the robot hand model 264M to track the workpiece model WM within the tracking operation range in the virtual space 110. Thus, in this embodiment, the CPU 12 functions as the tracking operation execution section 206 (FIG. 21) configured to cause the robot model 252M to carry out the tracking operation.

Then, the robot model 252M holds the workpiece model WM by the robot hand model 264M. Note that, the robot program described above is pre-stored in the system memory 14.

Figure 27:
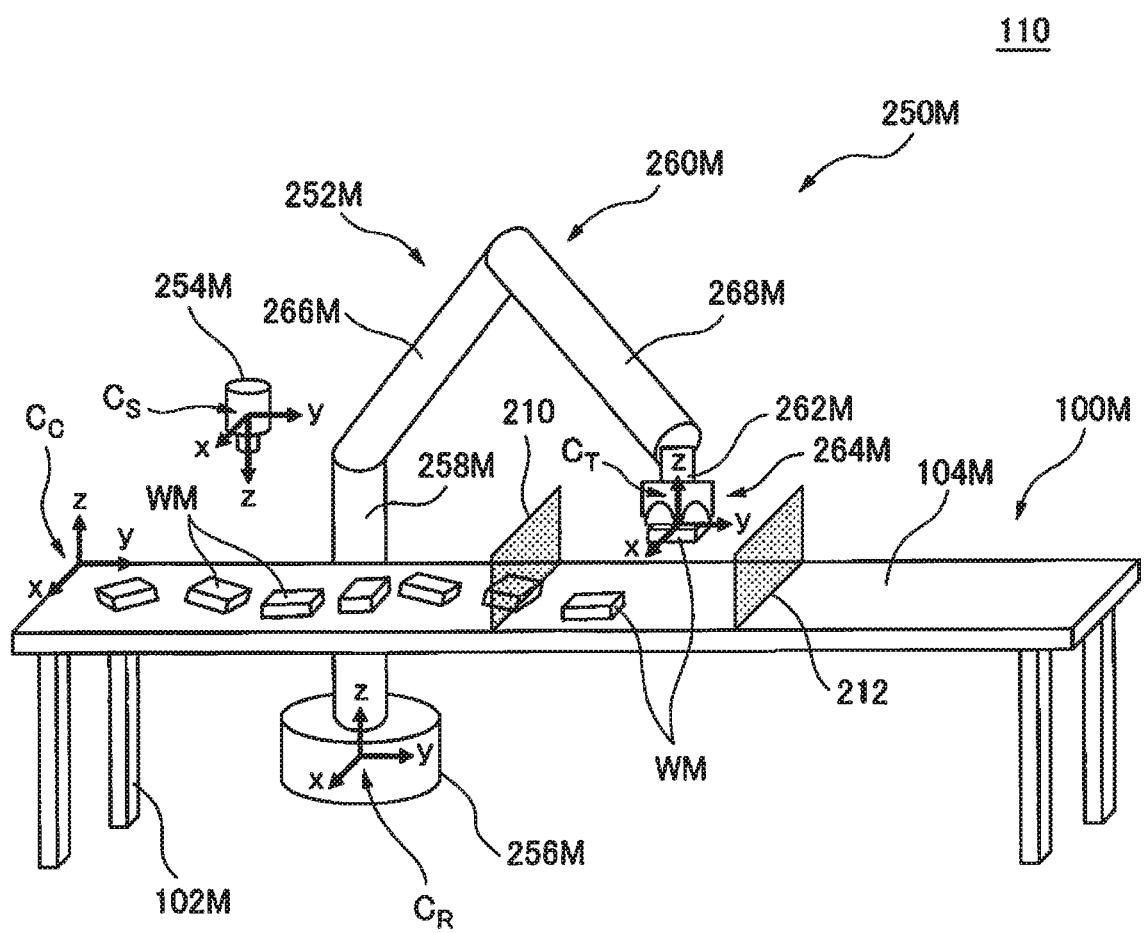
FIG. 27 is a diagram for explaining Step S44 in FIG. 23.

If the robot program is appropriately constructed, the robot model 252M can suitably hold and lift the workpiece model WM by the robot hand model 264M, as illustrated in FIG. 27.

On the other hand, if the robot program is not appropriately constructed, the robot hand model 264M fails to hold the workpiece model WM. In this case, the CPU 12 may display a warning image on the display 22. The CPU 12 carries out the simulation of the operation of the convey system model 250M as described above.

Thus, in this embodiment, the operation of holding and lifting the workpiece models WM, which are placed at random positions and orientations in Step S5, by the robot model 252M is simulated. According to this configuration, it is possible to simulate the operation of the robot system 250 in the real space in a manner closer to actual operation, while preventing occurrence of the interference region E.

In the above embodiments, the CPU 12 changes the coordinates $x_n$ and $y_n$ of the center $B_{1\_n}$ of the workpiece model $WM_n$ in Step S11. However, in Step S11, the CPU 12 may change the coordinates $x_n$ and $y_n$ of any reference point (e.g., one vertex of the workpiece model $WM_n$) of the workpiece model $WM_n$.

In the above-described embodiments, in Step S11, the position of the workpiece model $WM_n$, $WM_{n-1}$ is simulatively shifted in the virtual space 110. However, in Step S11, the CPU 12 may execute the operation of shifting the workpiece model $WM_n$ by calculation to search the non-interfering position (e.g., carry out calculation to change the profile data of the workpiece model $WM_n$).

In this case, in Step S9, the CPU 12 may correct the position of at least one of the workpiece models $WM_n$ and $WM_{n-1}$ so as to arrange at the non-interfering position searched by the calculation in Step S11.

In the above-described embodiments, the CPU 12 functions as the simulation devices 50, 160, 180, and 200. However, the simulation device 50, 160, 180, or 200 may be configured as an independent element separate from the CPU 12.

In this case, the simulation device 50, 160, 180, or 200 may include a second CPU which functions as the model arrangement section 52, the offset setting section 54, the conveying operation execution section 56, the interference detection section 58, the non-interfering position search section 60, the workpiece position correction section 62, the first ratio setting section 162, the second ratio setting section 182, the operation range setting section 204, and/or the tracking operation execution section 206.

In addition, the model arrangement section 52, the offset setting section 54, the conveying operation execution section 56, the interference detection section 58, the non-interfering position search section 60, the workpiece position correction section 62, the first ratio setting section 162, the second ratio setting section 182, the operation range setting section 204, or the tracking operation execution section 206 may be comprised of one computer with a CPU.

During execution of the simulation in Step S4 or S44, the CPU 12 may set a convey range in which the conveyor device model 100M conveys the workpieces WM. For example, the upstream end and the downstream end of the convey range may be respectively arranged in the vicinity of the upstream end and the downstream end of the conveying section model 104M.

In this case, the CPU 12 may arrange the workpiece model WM at the upstream end of the convey range in Step S5. Then, during execution of the simulation in Step S4 or S44, the conveyor device model 100M may convey the workpiece model WM to the downstream end. When the workpiece model WM reaches the downstream end of the convey range, the CPU 12 may delete the workpiece model WM from the virtual space 110.

While the present disclosure has been described through the embodiments, the above-described embodiments do not limit the invention according to the claims.

The invention claimed is:

1. A simulation device for a robot system in which a robot performs work on a plurality of workpieces conveyed by a conveyor device, the simulation device comprising:
a model arrangement section configured to arrange, in a virtual space, a conveyor device model that models the conveyor device, and continuously arranges a workpiece model, that models the workpiece, on the conveyor device model;
an offset determining section configured to randomly determine an offset amount of the workpiece model from its reference position predetermined with respect to the conveyor device model, each time the model arrangement section arranges the workpiece model, wherein the model arrangement section arranges the workpiece model at a position displaced from the reference position by the offset amount determined by the offset determining section;
a conveying operation execution section configured to perform a conveying operation to sequentially convey the plurality of workpiece models, arranged by the model arrangement section, in the virtual space;
an interference detection section configured to detect interference between at least two workpiece models sequentially conveyed by the conveyor device model;
a non-interfering position search section configured to search a non-interfering position where the interference does not occur for at least one of the at least two workpiece models for which the interference is detected; and
a workpiece position correction section configured to correct a position of the at least one workpiece model arranged on the conveyor device model, based on the searched non-interfering position.

2. The simulation device of claim 1, wherein the non-interfering position search section includes:
a position change section configured to change a relative position of the at least two workpiece models; and
an interference determination section configured to determine whether interference occurs between the at least two workpiece models at the changed relative position.

3. The simulation device of claim 1, wherein the offset determining section is configured to randomly determine at least one of:
a first offset amount offset from the reference position in a first direction parallel to a conveying direction in which the conveyor device model conveys the workpiece model;
a second offset amount offset from the reference position in a second direction orthogonal to the first direction; and
a third offset amount offset from the reference position in a rotation direction about an axis orthogonal to the first direction and the second direction.

4. The simulation device of claim 1, wherein the model arrangement section is configured to further arrange in the virtual space a robot model that models the robot, a robot hand model that models a robot hand holding the workpiece, and a sensor model that models a sensor configured to detect the workpiece, wherein the simulation device further comprises:
an operation range setting section configured to set, in the virtual space, a tracking operation range in which the robot model performs a tracking operation to cause the robot hand model to track the workpiece model conveyed by the conveyor device model; and
a tracking operation execution section configured to cause the robot model to perform the tracking operation based on a virtual detection result obtained by the sensor model detecting the workpiece model conveyed by the conveyor device model.

5. The simulation device of claim 1, wherein the plurality of workpiece models include a first type of workpiece models and a second type of workpiece models having different shapes from the first type of workpiece models, wherein the simulation device further comprises a first ratio setting section configured to set a ratio of the number of the first type of workpiece models and the number of the second type of workpiece models when the model arrangement section arranges the plurality of workpiece models.

6. The simulation device of claim 1, wherein each of the plurality of workpiece models includes a front surface and a back surface, wherein the simulation device further comprises a second ratio setting section configured to set a ratio of the number of workpiece models arranged such that the front surfaces thereof are visible and the number of workpiece models arranged such that the back surfaces thereof are visible when the model arrangement section arranges the plurality of workpiece models.

7. The simulation device of claim 1, wherein the model arrangement section continuously arranges the workpiece model at the position displaced from the reference position, during execution of the conveying operation by the conveying operation execution section, wherein the conveyor device model sequentially conveys the workpiece models continuously arranged by the model arrangement section in the conveying operation.

8. A simulation method for a robot system in which a robot performs work on a plurality of workpieces conveyed by a conveyor device, the simulation method comprising:
arranging, in a virtual space, a plurality of workpiece models and a conveyor device model that model the plurality of workpieces and the conveyor device, respectively;
randomly determining an offset amount of each workpiece model from its reference position predetermined with respect to the conveyor device model;
performing a conveying operation to sequentially convey the plurality of workpiece models, each of which is arranged at a position obtained from the reference position and the offset amount, by the conveyor device model;
detecting interference between at least two workpiece models sequentially conveyed by the conveyor device model;
searching a non-interfering position where the interference does not occur for at least one of the at least two workpiece models for which the interference is detected; and
correcting a position of the at least one workpiece model arranged on the conveyor device model, based on the searched non-interfering position.

9. A computer-readable storage medium storing a program that when executed by a computer causes the computer to execute a simulation in which a robot performs work on a plurality of workpieces conveyed by a conveyor device, to function as:
a model arrangement section configured to arrange, in a virtual space, a conveyor device model that models the conveyor device, and continuously arranges a workpiece model, that models the workpiece, on the conveyor device model;

an offset determining section configured to randomly determine an offset amount of the workpiece model from its reference position predetermined with respect to the conveyor device model, each time the model arrangement section arranges the workpiece model, wherein the model arrangement section arranges the workpiece model at a position displaced from the reference position by the offset amount determined by the offset determining section;

a conveying operation execution section configured to perform a conveying operation to sequentially convey the plurality of workpiece models arranged by the model arrangement section;

an interference detection section configured to detect interference between at least two workpiece models sequentially conveyed by the conveyor device model;

a non-interfering position search section configured to search a non-interfering position where the interference does not occurs for at least one of the at least two workpiece models for which the interference is detected; and a workpiece position correction section configured to correct the position of the at least one workpiece model arranged on the conveyor device model, based on the searched non interfering position.

* * * * *